US012739920B2

(12) United States Patent
Fujishiro et al.

(10) Patent No.: US 12,739,920 B2
(45) Date of Patent: Sep. 15, 2026

(54) RELAY NODE RECOVERY PROCESS

(71) Applicant: KYOCERA Corporation, Kyoto (JP)

(72) Inventors: Masato Fujishiro, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 700 days.

(21) Appl. No.: 18/164,214

(22) Filed: Feb. 3, 2023

(65) Prior Publication Data

US 2023/0189377 A1 Jun. 15, 2023

Related U.S. Application Data

(63) Continuation of application No. PCT/JP2021/029098, filed on Aug. 5, 2021.

(60) Provisional application No. 63/061,883, filed on Aug. 6, 2020.

(51) Int. Cl.
*H04W 76/19* (2018.01)
*H04W 24/04* (2009.01)
*H04W 92/18* (2009.01)

(52) U.S. Cl.
CPC .......... *H04W 76/19* (2018.02); *H04W 24/04* (2013.01); *H04W 92/18* (2013.01)

(58) Field of Classification Search
CPC ..... H04W 76/19; H04W 24/04; H04W 92/18; H04W 88/04; H04W 84/047; H04W 92/16
See application file for complete search history.

(56) References Cited

U.S. PATENT DOCUMENTS

2021/0315040 A1* 10/2021 Wu ........................ H04W 76/19
2022/0070959 A1* 3/2022 Jung ..................... H04W 24/04
2022/0141907 A1* 5/2022 Jia ......................... H04W 76/11 370/329
2022/0141910 A1* 5/2022 Muhammad ............ H04L 45/22
2024/0357465 A1* 10/2024 Fujishiro ............... H04W 40/22

FOREIGN PATENT DOCUMENTS

WO 2020/059470 A1 3/2020

OTHER PUBLICATIONS

ZTE, Sanechips; "Discussion on IAB RLF and IAB reestablishment", 3GPP TSG RAN WG3 Meeting #105bis, R3-195685, Chongqing, China, Oct. 14-18, 2019, total 8 pages.
ZTE, Sanechips; "Discussion on IAB BH RLF handling", 3GPP TSG-RAN WG2#109 electronic, R2-2000509, Feb. 24-Mar. 6, 2020, total 6 pages.

(Continued)

*Primary Examiner* — Alison Slater
(74) *Attorney, Agent, or Firm* — Studebaker Brackett PLLC

(57) ABSTRACT

A communication control method includes performing, by a relay node, recovery processing of recovering a radio backhaul link in response to an occurrence of an event related to a failure in the radio backhaul link. The performing the recovery processing includes transmitting failure information indicating the occurrence of the event to a lower node of the relay node at time of initiating RRC reestablishment processing of reestablishing the radio backhaul link, as a part of the recovery processing.

3 Claims, 16 Drawing Sheets

(56) References Cited

OTHER PUBLICATIONS

"3rd Generation Partnership Project; Technical Specification Group Radio Access Network; NR; NR and NG-RAN Overall Description; Stage 2"; Release 16; 3GPP TS 38.300 V16.2.0 (Jul. 2020); Jul. 2020; pp. 1-6.

CATT; "Summary of the email discussion [106#43][IAB] Backhaul RLF"; 3GPP TSG-RAN WG2 Meeting #107; R2-1908842; Prague, Czech Republic; Aug. 26-30, 2019; pp. 1-65.

Qualcomm Incorporated (Rapporteur); "Report email discussion [Post 109e#36][IAB] RLF Handling Open Issues"; 3GPP TSG-RAN WG2 Meeting #109e-bis; R2-2003813; Electronic meeting; Apr. 20-Apr. 30, 2020; pp. 1-56.

Ericsson; "CR TS 38.472: Handling of SCTP Transport for IAB-MTs in Inactive State"; 3GPP TSG-RAN WG3 Meeting #108-e; R3-203817; Online; Jun. 1-11, 2020; pp. 1-4.

"3rd Generation Partnership Project; Technical Specification Group Radio Access Network; NR; Radio Resource Control (RRC) protocol specification"; Release 16; 3GPP TS 38.331 V16.1.0 (Jul. 2020), Jul. 2020, pp. 1-23.

3rd Generation Partnership Project; Technical Specification Group Radio Access Network; Evolved Universal Terrestrial Radio Access (E-UTRA) and NR; Multi-connectivity; Stage 2; Release 16; 3GPP TS 37.340 V16.2.0 (Jul. 2020); Jul. 2020; pp. 1-21.

NEC, "Discussion on IAB BH RLF handling," 3GPP TSG-RAN WG2#109bis electronic, R2-2002991, Apr. 24-Apr. 30, 2020, total 4 pages.

Nokia, Nokia Shanghai Bell; "E-mail discussion report [Post109e#12][MOB] Resolving open issues for CHO"; 3GPP TSG-RAN WG2 Meeting #109bis; R2-2003105; Online, Apr. 20-30, 2020; pp. 1-15.

ZTE, Sanechips; "Discussion on IAB BH RLF handling"; 3GPP TSG RAN WG2 Meeting #106; R2-1906575; Reno, USA; May 13-17, 2019; pp. 1-5.

* cited by examiner

FIG. 2

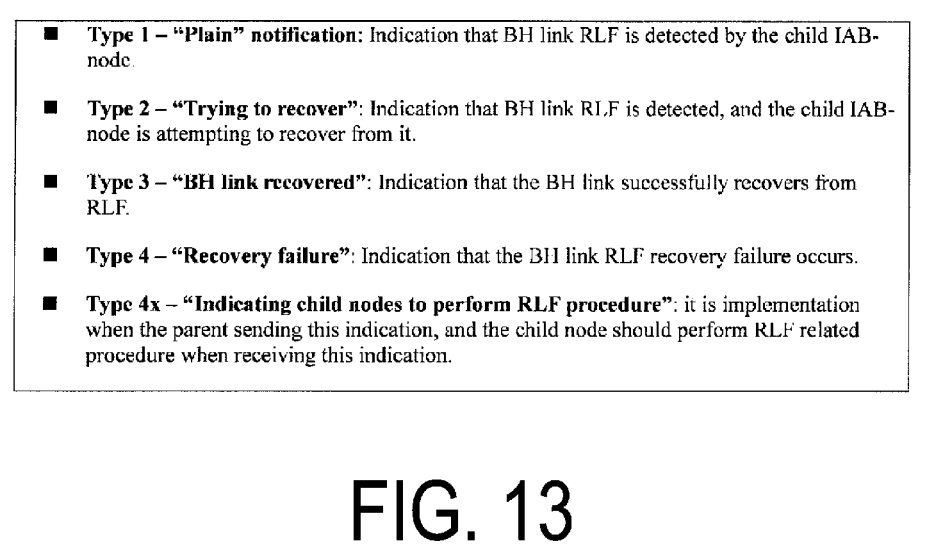

- Type 1 – "Plain" notification: Indication that BH link RLF is detected by the child IAB-node.
- Type 2 – "Trying to recover": Indication that BH link RLF is detected, and the child IAB-node is attempting to recover from it.
- Type 3 – "BH link recovered": Indication that the BH link successfully recovers from RLF.
- Type 4 – "Recovery failure": Indication that the BH link RLF recovery failure occurs.
- Type 4x – "Indicating child nodes to perform RLF procedure": it is implementation when the parent sending this indication, and the child node should perform RLF related procedure when receiving this indication.

FIG. 13

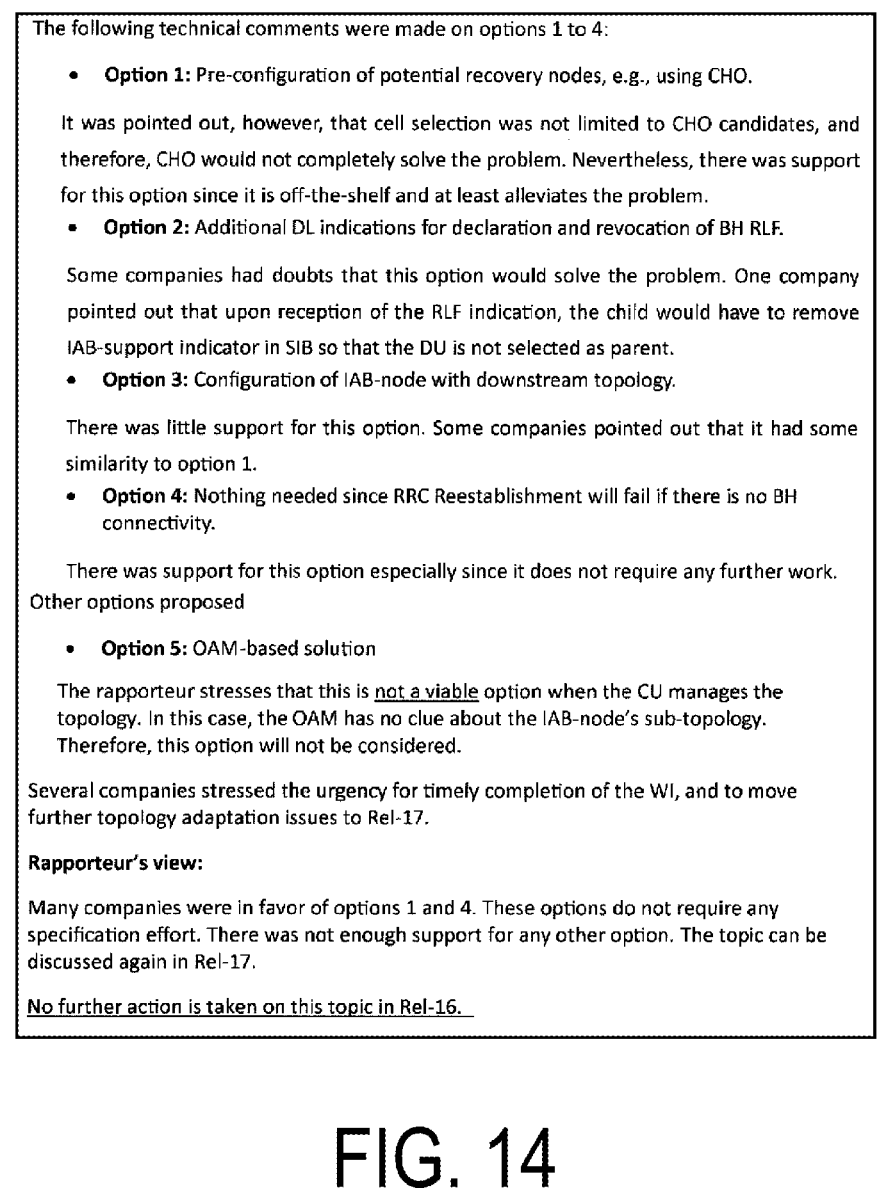

The following technical comments were made on options 1 to 4:

- Option 1: Pre-configuration of potential recovery nodes, e.g., using CHO.

It was pointed out, however, that cell selection was not limited to CHO candidates, and therefore, CHO would not completely solve the problem. Nevertheless, there was support for this option since it is off-the-shelf and at least alleviates the problem.

- Option 2: Additional DL indications for declaration and revocation of BH RLF.

Some companies had doubts that this option would solve the problem. One company pointed out that upon reception of the RLF indication, the child would have to remove IAB-support indicator in SIB so that the DU is not selected as parent.

- Option 3: Configuration of IAB-node with downstream topology.

There was little support for this option. Some companies pointed out that it had some similarity to option 1.

- Option 4: Nothing needed since RRC Reestablishment will fail if there is no BH connectivity.

There was support for this option especially since it does not require any further work.

Other options proposed

- Option 5: OAM-based solution

The rapporteur stresses that this is not a viable option when the CU manages the topology. In this case, the OAM has no clue about the IAB-node's sub-topology. Therefore, this option will not be considered.

Several companies stressed the urgency for timely completion of the WI, and to move further topology adaptation issues to Rel-17.

Rapporteur's view:

Many companies were in favor of options 1 and 4. These options do not require any specification effort. There was not enough support for any other option. The topic can be discussed again in Rel-17.

No further action is taken on this topic in Rel-16.

FIG. 14

| | Modification of PDCP protocol/procedures | Rerouting of PDCP PDUs buffered on intermediate IAB-nodes | Introducing UL status delivery |
|---|---|---|---|
| **Applicable to Rel-15 UEs** | **No** | **Yes** | **Yes** |
| **Signaling overhead** | **Yes**<br>New signaling for triggering data retransmission | **Yes**<br>New signaling for either deciding whether to discard the buffered data or configuring the forwarding path for the buffered data on the old route. | **Yes**<br>New signaling for confirming data reception and/or triggering data retransmission. |
| **Support of lossless delivery of UL data** | **Yes** | **No** | **Yes** |

FIG. 15

| Solution | Descriptions |
| --- | --- |
| C-1 | Access IAB node delays the sending of RLC ACKs to UE until a confirmation of reception at IAB donor [3, 4, 7].<br><br>When PDCP data recovery / PDCP re-establishment is triggered by RRC, UE retransmits all the PDCP SDUs for which the successful delivery has not been confirmed by lower layers as in the current PDCP specification.<br><br>C-1 would need UL status report from IAB donor to access IAB node. This could be UE bearer specific due to its end to end nature. |
| C-2 | Access IAB node delays the sending of RLC ACKs to UE until a confirmation of reception at its parent node, and the parent node should also delay the sending of RLC ACKs to its child node until a confirmation of reception at its parent node, and so on [4].<br><br>When PDCP data recovery / PDCP re-establishment is triggered by RRC, UE retransmits all the PDCP SDUs for which the successful delivery has not been confirmed by lower layers as in the current PDCP specification.<br><br>C-2 would need some enhancements towards RLC ACK/NACK operation between IAB nodes, e.g. with hop by hop RLC ARQ, BH RLC channels multiplex data from many UEs, potentially being served by different downstream IAB nodes. This may lead to stalling RLC ACKs for some UEs based on data being not confirmed for other UEs. |

FIG. 16

RELAY NODE RECOVERY PROCESS

RELATED APPLICATIONS

The present application is a continuation based on PCT Application No. PCT/JP2021/029098, filed on Aug. 5, 2021, which claims the benefit of U.S. Patent Application No. 63/061883 filed on Aug. 6, 2020. The content of which is incorporated by reference herein in their entirety.

TECHNICAL FIELD

The present disclosure relates to a communication control method used in a mobile communication system.

BACKGROUND OF INVENTION

In the 3rd Generation Partnership Project (3GPP), which is a standardization project of a mobile communication system, a new relay node referred to as an Integrated Access and Backhaul (IAB) node is defined (for example, see "3GPP TS 38.300 V16.2.0 (2020-07)"). One or more relay nodes are involved in communication between a base station and a user equipment, and perform relay for the communication.

SUMMARY

In a first aspect, a communication control method includes performing, by a relay node including a radio backhaul link, recovery processing of recovering the radio backhaul link in response to an occurrence of an event related to a failure in the radio backhaul link. The performing the recovery processing includes transmitting failure information indicating the occurrence of the event to a lower node of the relay node at time of initiating Radio Resource Control (RRC) reestablishment processing of reestablishing the radio backhaul link, as a part of the recovery processing.

In a second aspect, a communication control method includes, receiving, by a first relay node including a radio backhaul link and from a donor base station, cell information used at time of performing a cell selection procedure of determining a target cell of reestablishment of the radio backhaul link. The cell information includes any one of allowed cell information identifying a cell that is allowed to be selected as the target cell and not-allowed cell information identifying a cell that is not allowed to be selected as the target cell.

In a third aspect, a communication control method includes, transmitting, by a first relay node including a radio backhaul link and to a second relay node under control of the first relay node, a message of causing the second relay node to transition to a Radio Resource Control (RRC) inactive state.

BRIEF DESCRIPTION OF THE DRAWINGS

FIG. 2 is a diagram illustrating a configuration of a gNB 200 according to an embodiment.

FIG. 13 is a diagram illustrating types of BH RLF notifications.

FIG. 14 is a diagram illustrating identified solutions for avoiding reestablishment to a descendant node.

FIG. 15 is a diagram illustrating a comparison of mechanisms for lossless delivery of UL data in a case of hop-by-hop RLC ARQ.

FIG. 16 is a diagram illustrating options of introduction of UL status delivery.

DESCRIPTION OF EMBODIMENTS

A mobile communication system according to embodiments will be described with reference to the drawings. In the description of the drawings, the same or similar parts are denoted by the same or similar reference signs.

Configuration of Mobile Communication System

Figure 1:
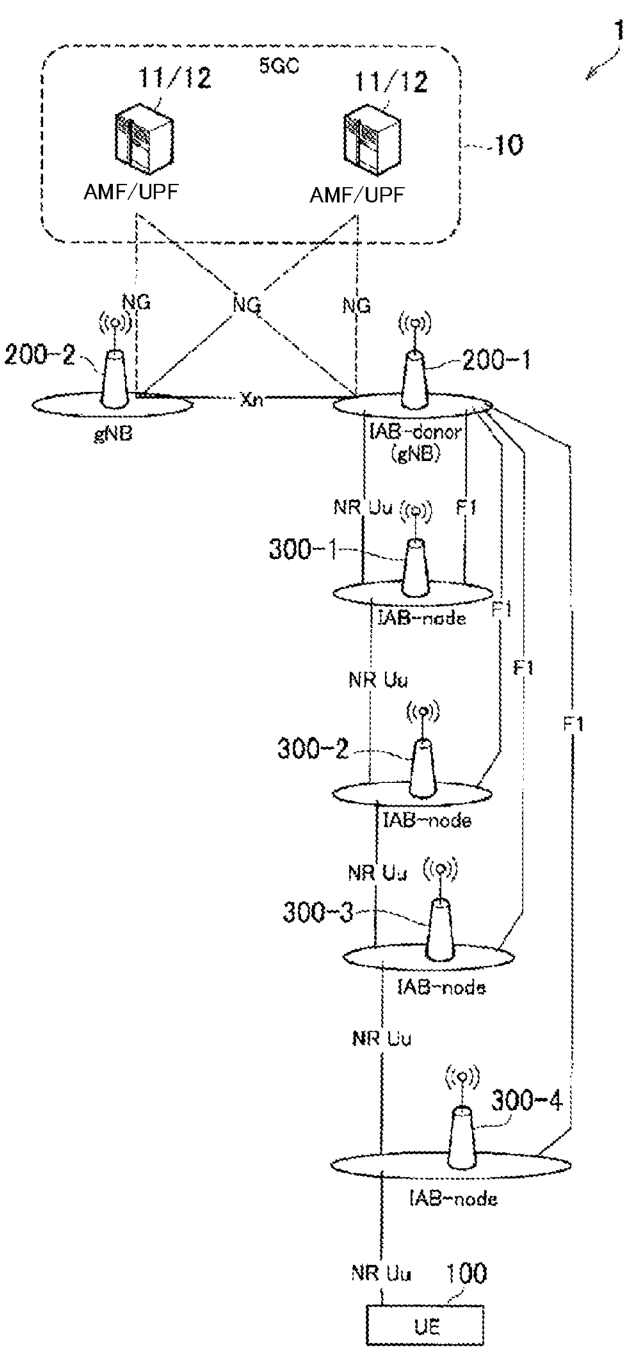
FIG. 1 is a diagram illustrating a configuration of a mobile communication system 1 according to an embodiment.

First, a configuration of a mobile communication system according to an embodiment will be described. FIG. 1 is a diagram illustrating a configuration of a mobile communication system 1 according to an embodiment.

The mobile communication system 1 is a fifth generation (5G) mobile communication system based on the 3GPP standard. Specifically, a radio access scheme in the mobile communication system 1 is New Radio (NR) being a radio access scheme of the 5G. Note that Long Term Evolution (LTE) may be at least partially applied to the mobile communication system 1.

As illustrated in FIG. 1, the mobile communication system 1 includes a 5G core network (5GC) 10, a User Equipment (UE) 100, base stations (referred to as gNBs) 200, and IAB nodes 300. Each IAB node 300 is an example of a relay node. In an embodiment, an example in which each base station is an NR base station (i.e., a gNB) will be mainly described; however, the base station may be an LTE base station (i.e., an eNB).

The 5GC 10 includes an Access and Mobility Management Function (AMF) 11 and a User Plane Function (UPF) 12. The AMF 11 is an apparatus that performs various types of mobility controls and the like for the UE 100. The AMF 11 communicates with the UE 100 by using Non-Access Stratum (NAS) signaling, and thereby manages information of an area in which the UE 100 exists. The UPF 12 is an apparatus that performs transfer control of user data and the like.

Each gNB 200 is a fixed wireless communication node and manages one or more cells. The term "cell" is used to indicate a minimum unit of a wireless communication area. The term "cell" may be used to indicate a function or a resource for performing wireless communication with the UE 100. One cell belongs to one carrier frequency.

Each gNB 200 is interconnected to the 5GC 10 via an interface referred to as an NG interface. FIG. 1 illustrates two gNBs, namely a gNB 200-1 and a gNB 200-2 that are connected to the 5GC 10.

Each gNB 200 is interconnected to another neighboring gNB 200 via an inter-base station interface referred to as an Xn interface. FIG. 1 illustrates an example in which the gNB 200-1 is connected to the gNB 200-2.

Each gNB 200 may be divided into a Central Unit (CU) and a Distributed Unit (DU). The CU and the DU are interconnected via an interface referred to as an F1 interface. The F1 protocol is a communication protocol between the CU and the DU and includes an F1-C protocol corresponding to a protocol for a control plane and an F1-U protocol corresponding to a protocol for a user plane.

The mobile communication system 1 supports an IAB that uses NR for the backhaul to enable wireless relay of NR access. The donor gNB 200-1 is a gNB 200 corresponding to a terminal node of the NR backhaul on the network end and including additional functions that support the IAB. The backhaul can implement multi-hop via a plurality of hops (i.e., a plurality of IAB nodes 300).

Each IAB node 300 includes a DU functional unit and a Mobile Termination (MT) functional unit.

The MT is connected to the DU of an upper node (upper IAB node 300 or donor gNB 200-1). The MT is connected to the CU of the donor gNB 200-1 by using Radio Resource Control (RRC) and establishes, with the donor gNB 200-1, a signaling radio bearer (SRB) that carries an RRC message and an NAS message. A neighboring node (i.e., an upper node) on an NR Uu wireless interface of the MT may be referred to as a "parent node".

The DU manages cells in a manner the same as/or similar to the gNB 200. The DU terminates the NR Uu wireless interface to the UE 100 or lower IAB nodes 300. The DU supports the F1 protocol for the CU of the donor gNB 200-1. A neighboring node (i.e., a lower node) on an NR access interface of the DU may be referred to as a "child node".

All of the IAB nodes 300 connected to the donor gNB 200-1 via one or more hops form IAB topology with the donor gNB 200-1 as a root. Such IAB topology may be referred to as a Directed Acyclic Graph (DAG). In the IAB topology, the direction toward the parent node may be referred to as "upstream" or "upper", and the direction toward the child node may be referred to "downstream" or "lower".

The MT of each IAB node 300 in the IAB topology establishes a radio backhaul link with the DU of the parent node (the IAB node 300 or the donor gNB 200-1). The MT of the IAB node 300 establishes one radio backhaul link with one parent node.

The DU of the IAB node 300 configures one of the cells managed by the DU for an MT of a child node that has established a radio backhaul link with the IAB node 300, as a serving cell of the MT. The serving cell is a cell for providing radio resources used on the radio backhaul link. The DU of the IAB node 300 may configure a cell group (CG) consisting of a plurality of serving cells for the MT of the child node.

The IAB node 300 may include a plurality of parent nodes. In other words, one IAB node 300 may establish a radio backhaul link with each of the plurality of IAB nodes 300 being the parent nodes. For example, the IAB node 300 may have duplex connection with two parent nodes. Of the two parent nodes, one parent node is a master node (MN), and the other parent node is a secondary node (SN). A radio backhaul link between the IAB node 300 and the MN may be referred to as a Master Cell Group (MCG) link, and a radio backhaul link between the IAB node 300 and the SN may be referred to as a Secondary Cell Group (SCG) link.

FIG. 1 illustrates an example in which the IAB node 300-1 is wirelessly connected to the donor gNB 200-1, the IAB node 300-2 is wirelessly connected to the IAB node 300-1, the IAB node 300-3 is wirelessly connected to the IAB node 300-2, the IAB node 300-4 is wirelessly connected to the IAB node 300-3, and the F1 protocol is transmitted via four backhaul hops.

The UE 100 is a mobile wireless communication apparatus that performs wireless communication with cells. The UE 100 may be any type of apparatus as long as the UE 100 is an apparatus that performs wireless communication with the gNB 200 or the IAB node 300. For example, the UE 100 is a mobile phone terminal, a tablet terminal, a laptop PC, a sensor, an apparatus that is provided in the sensor, a vehicle, or an apparatus that is provided in the vehicle. The UE 100 is wirelessly connected to an upper node (the IAB node 300 or the gNB 200) via a radio access link. When the IAB node 300 having a radio access link with the UE 100 relays communication of the UE 100, the IAB node 300 operates as an access IAB node 300 of the UE 100.

FIG. 1 illustrates an example in which the UE 100 is wirelessly connected to the IAB node 300-4. The UE 100 indirectly communicates with the donor gNB 200-1 via the IAB node 300-4, the IAB node 300-3, the IAB node 300-2, and the IAB node 300-1. Specifically, each of the IAB node 300-4, the IAB node 300-3, the IAB node 300-2, and the IAB node 300-1 relays uplink data from the UE 100 to the donor gNB 200-1 and relays downlink data from the gNB 200-1 to the UE 100.

Figure 2:
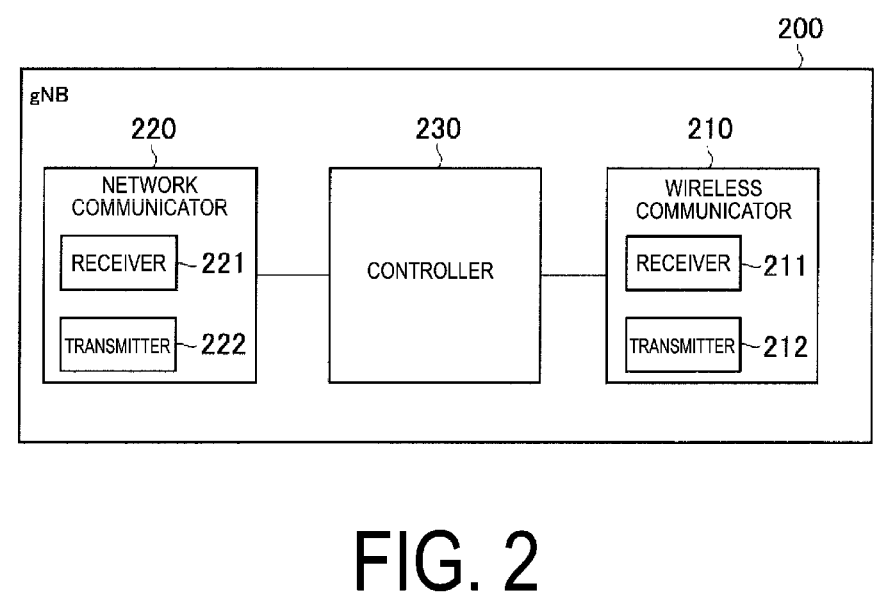

In an embodiment, a configuration of the gNB 200 that is a base station will be described. FIG. 2 is a diagram illustrating a configuration of the gNB 200. As illustrated in FIG. 2, the gNB 200 includes a wireless communicator 210, a network communicator 220, and a controller 230.

The wireless communicator 210 performs wireless communication with the UE 100 and performs wireless communication with the IAB node 300. The wireless communicator 210 includes a receiver 211 and a transmitter 212. The receiver 211 performs various types of reception under control of the controller 230. The receiver 211 includes an antenna, converts a radio signal received by the antenna into a baseband signal (received signal), and outputs the baseband signal to the controller 230. The transmitter 212 performs various types of transmission under control of the controller 230. The transmitter 212 includes an antenna, converts a baseband signal (transmission signal) to be output by the controller 230 into a radio signal, and transmits the radio signal from the antenna.

The network communicator 220 performs wired communication (or wireless communication) with the 5GC 10 and performs wired communication (or wireless communication) with another neighboring gNB 200. The network communicator 220 includes a receiver 221 and a transmitter 222. The receiver 221 performs various types of reception under control of the controller 230. The receiver 221 receives a signal from the outside and outputs the received signal to the controller 230. The transmitter 222 performs various types of transmission under control of the controller 230. The transmitter 222 transmits a transmission signal output by the controller 230 to the outside.

The controller 230 performs various types of controls in the gNB 200. The controller 230 includes at least one memory and at least one processor electrically connected to the memory. The memory stores a program to be executed by the processor and information to be used for processing by the processor. The processor may include a baseband processor and a Central Processing Unit (CPU). The baseband processor performs modulation and demodulation, coding and decoding, and the like of a baseband signal. The CPU executes the program stored in the memory to thereby perform various types of processing. The processor performs processing of the layers described below.

Figure 3:
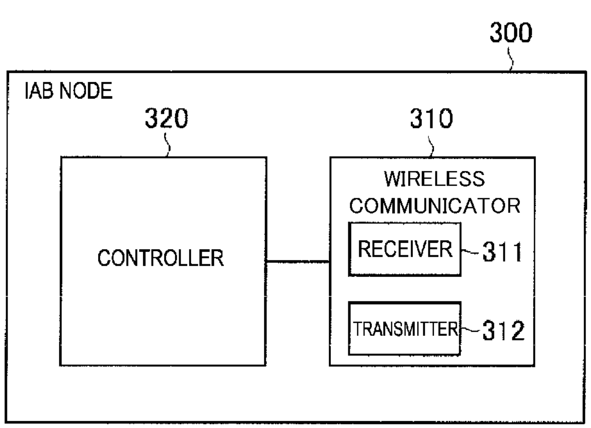
FIG. 3 is a diagram illustrating a configuration of an IAB node 300 according to an embodiment.

In an embodiment, a configuration of the IAB node 300 that is a relay node will be described. FIG. 3 is a diagram illustrating a configuration of the IAB node 300. As illustrated in FIG. 3, the IAB node 300 includes a wireless communicator 310 and a controller 320. The IAB node 300 may include a plurality of wireless communicators 310.

The wireless communicator 310 performs wireless communication (radio backhaul link) with the gNB 200 or another IAB node 300 and performs wireless communication (radio access link) with the UE 100. The wireless communicator 310 for radio backhaul link communication and the wireless communicator 310 for radio access link communication may be provided separately.

The wireless communicator 310 includes a receiver 311 and a transmitter 312. The receiver 311 performs various types of reception under control of the controller 320. The receiver 311 includes an antenna, converts a radio signal received by the antenna into a baseband signal (received signal), and outputs the baseband signal to the controller 320. The transmitter 312 performs various types of transmission under control of the controller 320. The transmitter 312 includes an antenna, converts a baseband signal (transmission signal) to be output by the controller 320 into a radio signal, and transmits the radio signal from the antenna.

The controller 320 performs various types of controls in the IAB node 300. The controller 320 includes at least one memory and at least one processor electrically connected to the memory. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing. The processor performs processing of the layers described below.

Figure 4:
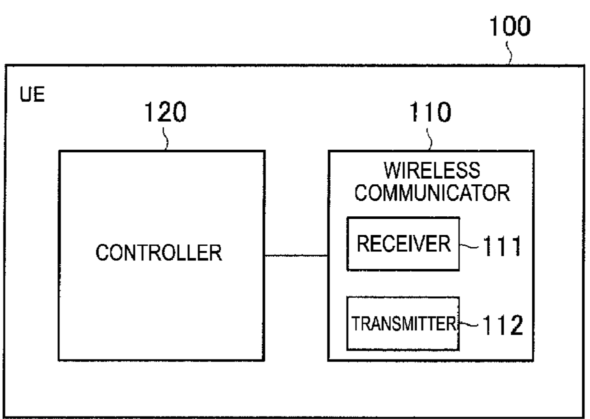
FIG. 4 is a diagram illustrating a configuration of a UE 100 according to an embodiment.

In an embodiment, a configuration of the UE 100 that is a user equipment will be described. FIG. 4 is a diagram illustrating a configuration of the UE 100. As illustrated in FIG. 4, the UE 100 includes a wireless communicator 110 and a controller 120.

The wireless communicator 110 performs wireless communication in the radio access link, that is, wireless communication with the gNB 200 or wireless communication with the IAB node 300. The wireless communicator 110 includes a receiver 111 and a transmitter 112. The receiver 111 performs various types of reception under control of the controller 120. The receiver 111 includes an antenna, converts a radio signal received by the antenna into a baseband signal (received signal), and outputs the baseband signal to the controller 120. The transmitter 112 performs various types of transmission under control of the controller 120. The transmitter 112 includes an antenna, converts a baseband signal (transmission signal) to be output by the controller 120 into a radio signal, and transmits the radio signal from the antenna.

The controller 120 performs various types of control in the UE 100. The controller 120 includes at least one memory and at least one processor electrically connected to the memory. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing. The processor performs processing of the layers described below.

Note that, although illustration is omitted in FIG. 4, the UE 100 may include a Global Navigation Satellite System (GNSS) receiver. The UE 100 need not include the GNSS receiver.

Protocol Stack

Figure 5:
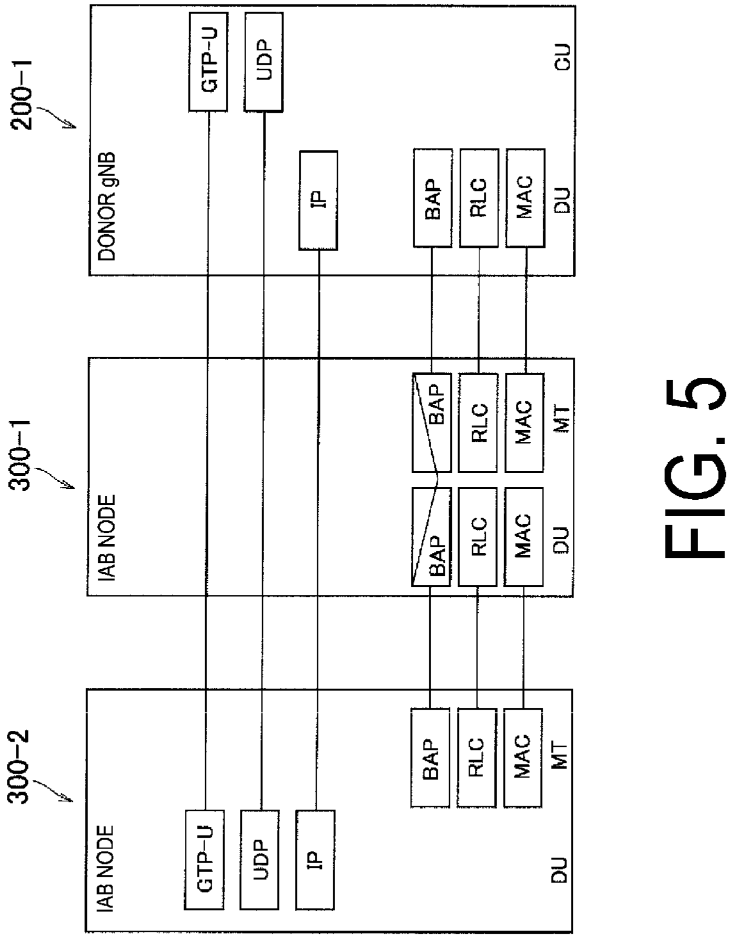
FIG. 5 is a diagram illustrating an example of a protocol stack of a user plane according to an embodiment.

An example of a protocol stack configuration in the mobile communication system 1 according to an embodiment will be described. FIG. 5 is a diagram illustrating an example of a protocol stack of a user plane.

FIG. 5 illustrates an example of a protocol stack of the user plane in a case in which user data is communicated between the IAB node 300-2 and the donor gNB 200-1.

As illustrated in FIG. 5, each of the IAB node 300-1 to the IAB node 300-2 includes each functional unit of the MT and the DU. The MT includes each layer of the Backhaul Adaptation Protocol (BAP), the Radio Link Control (RLC), and the Medium Access Control (MAC). The DU includes each layer of the BAP, the RLC, and the MAC. FIG. 5 illustrates an example in which the BAP layer of the DU and the BAP layer of the MT are separately provided; however, the BAP layer of the DU and the BAP layer of the MT may be integrated.

The DU of the IAB node 300-2 and the CU of the donor gNB 200-1 include each layer of the User Datagram Protocol (UDP) and the GPRS Tunnelling Protocol for User Plane (GTP-U). The DU of the IAB node 300-2 and the DU of the donor gNB 200-1 include the Internet Protocol (IP) layer. Each layer of the GTP-U and the UDP of the IAB node 300-2 communicates with each layer of the GTP-U and the UDP of the CU of the donor gNB 200-1, respectively, via the IAB node 300-1.

Figure 6:
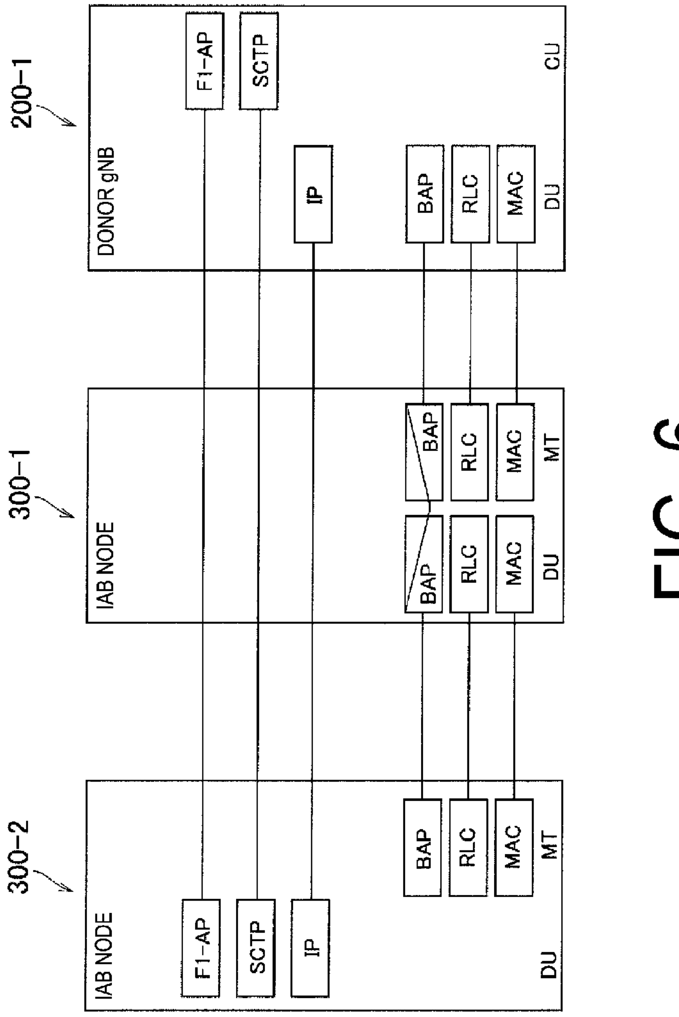
FIG. 6 is a diagram illustrating an example of a protocol stack of a control plane (F1-C) according to an embodiment.

FIG. 6 is a diagram illustrating an example of a protocol stack of the control plane (F1-C).

FIG. 6 illustrates an example of a protocol stack of the control plane in a case in which an F1 Application Protocol (F1-AP) control signal is communicated between the IAB node 300-2 and the donor gNB 200-1.

As illustrated in FIG. 6, the DU of the IAB node 300-2 and the CU of the donor gNB 200-1 include each layer of the F1-AP and the Stream Control Transmission Protocol (SCTP). The DU of the IAB node 300-2 and the DU of the donor gNB 200-1 include an IP layer. Each layer of the F1-AP and the SCTP of the IAB node 300-2 communicates with each layer of the F1-AP and the SCTP of the CU of the donor gNB 200-1, respectively, via the IAB node 300-1.

Figure 7:
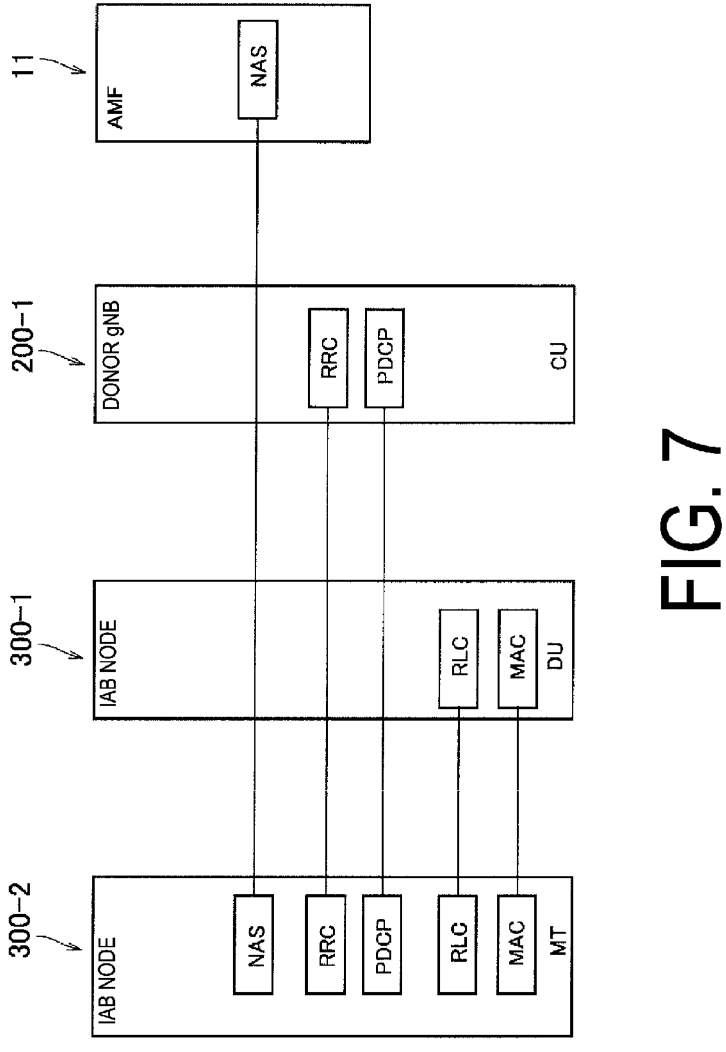
FIG. 7 is a diagram illustrating an example of a protocol stack of a control plane (RRC and NAS) according to an embodiment.

FIG. 7 is a diagram illustrating an example of a protocol stack of the control plane (RRC and NAS).

FIG. 7 illustrates an example of a protocol stack of the control plane in a case in which an RRC control signal (RRC message) is communicated between the IAB node 300-2 and the donor gNB 200-1 and a NAS control signal (NAS message) is communicated between the IAB node 300-2 and the AMF 11.

As illustrated in FIG. 7, the MT of the IAB node 300-2 and the CU of the donor gNB 200-1 include each layer of the RRC and the Packet Data Convergence Protocol (PDCP). Each layer of the RRC and the PDCP of the IAB node 300-2 communicates with each layer of the RRC and the PDCP of the CU of the donor gNB 200-1, respectively, via the IAB node 300-1.

The NAS layer of the MT of the IAB node 300-2 communicates with the NAS layer of the AMF 11.

Note that, although illustration is omitted in FIG. 7, the RRC control signal and the NAS control signal described above are transmitted via the BAP layer of the DU of the IAB node 300-1 and the BAP layer of the DU of the donor gNB 200-1.

Note that, although illustration is omitted in FIGS. 5 to 7, the PHY layer is deployed in a layer lower than the MAC layer of each node.

Here, each protocol will be described. The PHY layer performs coding and decoding, modulation and demodulation, antenna mapping and demapping, and resource mapping and demapping. Data and control information are transmitted between the PHY layers via a physical channel.

The MAC layer performs priority control of data, retransmission processing by hybrid ARQ (HARD), and the like. Data and control information are transmitted between the MAC layers via a transport channel. Each of the MAC layer of the donor gNB 200-1 and the MAC layer of the DU includes a scheduler. The scheduler determines transport formats (transport block sizes, modulation and coding schemes (MCSs)) in the uplink and the downlink and resource blocks to be allocated to the UE 100.

The RLC layer transmits data to the RLC layer on the reception end by using functions of the MAC layer and the PHY layer. Data and control information are transmitted between the RLC layers via a logical channel.

The BAP layer performs routing processing and bearer mapping and demapping processing in the user plane. Details of processing in the BAP layer will be described below.

The RRC layer transmits RRC signaling (RRC message) for various configurations. The RRC layer controls a logical channel, a transport channel, and a physical channel depending on establishment, reestablishment, and release of a radio bearer. With an RRC connection between the RRC layers, the IAB node 300 is in an RRC connected state. With no RRC connection between the RRC layers, the IAB node 300 is in an RRC idle state.

When the RRC connection is inactive, the IAB node 300 (MT) is in an RRC inactive state. The RRC inactive state is a state different from the RRC idle state and the RRC connected state. The RRC inactive state is a state in which a context of the IAB node 300 is stored in the IAB node 300 and the donor gNB 200-1 (5GC 10) as is the case with the RRC connected state.

The context may be an AS context of the IAB node 300. The AS context may include information for RRC reestablishment. The AS context may include radio access capability of the IAB node 300. The context may include a security context. The security context may include a KgNB, a token, NextHopChainingCount (NCC), a security capability, and a security algorithm.

IAB Topology

Figure 8:
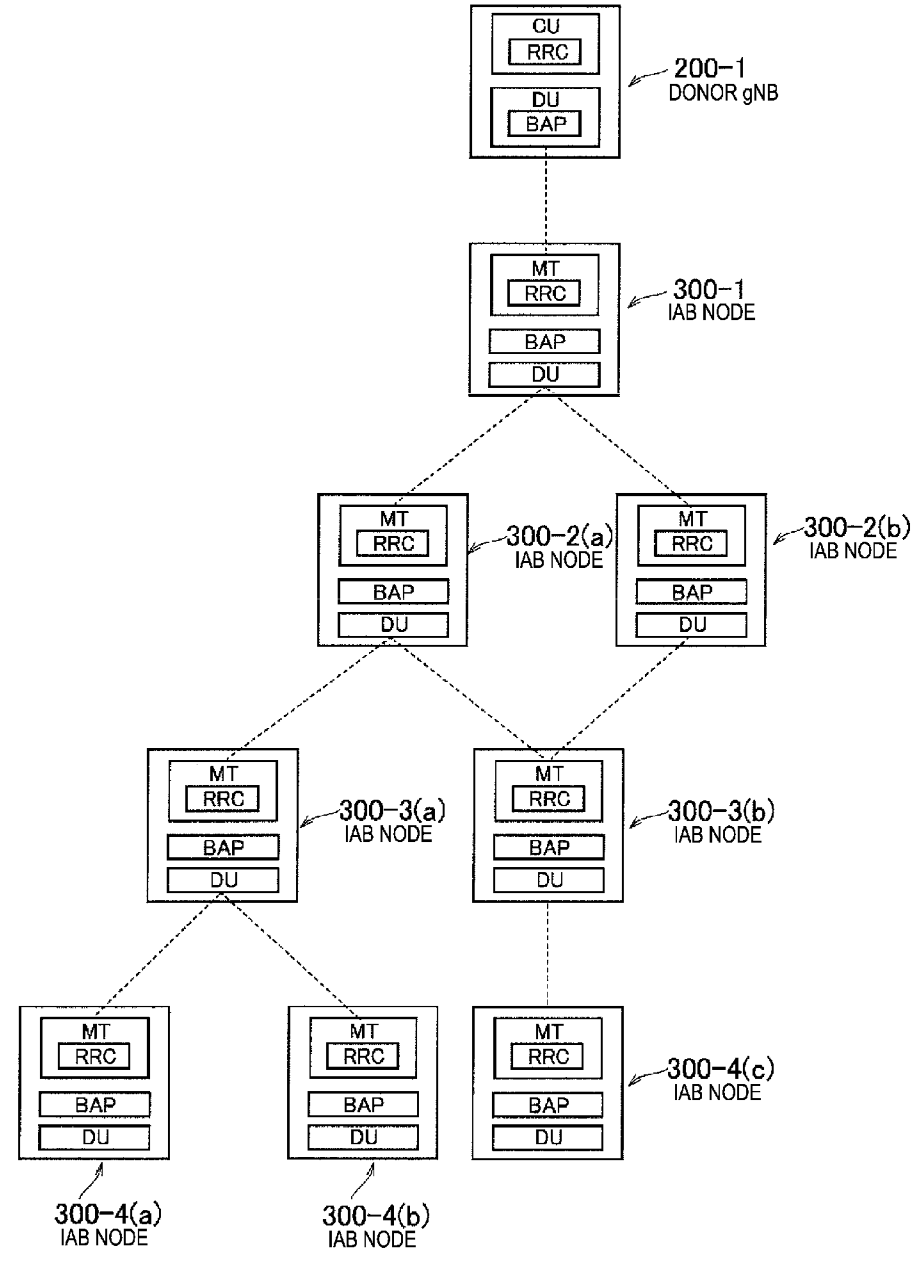
FIG. 8 is a diagram illustrating IAB topology according to an embodiment.

The IAB topology according to an embodiment will be described. FIG. 8 is a diagram illustrating the IAB topology according to an embodiment.

As illustrated in FIG. 8, the IAB topology includes an IAB node 300-1, an IAB node 300-2(*a*), an IAB node 300-2(*b*), an IAB node 300-3(*a*), an IAB node 300-3(*b*), an IAB node 300-4(*a*), an IAB node 300-4(*b*), and an IAB node 300-4(*c*). The MT of each IAB node 300 establishes a radio backhaul link with the DU of the parent node. The IAB node 300-3(*b*) has duplex connection with the IAB node 300-2(*a*) and the IAB node 300-2(*b*) and establishes a radio backhaul link with each of the IAB node 300-2(*a*) and the IAB node 300-2(*b*). In FIG. 8, the radio backhaul link is illustrated by a broken line.

Note that, although illustration is omitted in FIG. 8, the UE 100 may be connected to the DU of each IAB node 300.

The donor gNB 200-1 configures a relay path between the donor gNB 200-1 and each IAB node 300. The relay path configured for an IAB node 300 is a path that enables communication between a communication apparatus served by the IAB node 300 and the donor gNB 200-1. The communication apparatus served by the IAB node 300 includes a child node (MT) including a radio backhaul link with the DU of the IAB node 300, and the UE 100 including a radio access link with the DU of the IAB node 300.

The donor gNB 200-1 may configure a plurality of relay paths for the IAB node 300 including a plurality of parent nodes.

The donor gNB 200-1 may configure the following four relay paths in the IAB topology, for example.

Relay path #1: donor gNB 200-1⇆IAB node 300-1⇆IAB node 300-2(*a*)⇆IAB node 300-3(*b*)⇆IAB node 300-4(*c*)

Relay path #2: donor gNB 200-1⇆IAB node 300-1⇆IAB node 300-2(*a*)⇆IAB node 300-3(*a*)⇆IAB node 300-4(*a*)

Relay path #3: donor gNB 200-1⇆IAB node 300-1⇆IAB node 300-2(*a*)⇆IAB node 300-3(*a*)⇆IAB node 300-4(*b*)

Relay path #4: donor gNB 200-1⇆IAB node 300-1⇆IAB node 300-2(*b*)⇆IAB node 300-3(*b*)⇆IAB node 300-4(*c*)

The donor gNB 200-1 allocates, to each relay path in the IAB topology, a path identifier identifying the relay path. The donor gNB 200-1 allocates, to each IAB node 300 in the IAB topology, an IAB identifier identifying the IAB node 300 in the IAB topology. The IAB identifier may be a BAP address allocated to the BAP layer (BAP entity).

The donor gNB 200-1 transmits, to each IAB node 300 in the IAB topology, routing configuration information related to the relay path passing through the IAB node 300. Each IAB node 300 stores the routing configuration information. The routing configuration information is transmitted by an RRC message or an F1AP message.

The routing configuration information to be transmitted to the IAB node 300 includes path identifier(s) of relay path(s) (one or more relay paths) passing through the IAB node 300, and an IAB identifier of a subsequent node (that is, a child node and/or a parent node) of the IAB node 300 in the relay path(s) passing through the IAB node 300. The subsequent node of the IAB node 300 in the relay path may be referred to as "NEXT HOP" of the IAB node.

In establishing F1-AP connection with the CU of the donor gNB 200-1, the DU of the IAB node 300 notifies the donor gNB 200-1 of a cell identifier of a cell managed by the DU of the IAB node 300. With this, the donor gNB 200-1 can recognize the cell identifier of the cell managed by the DU of each IAB node 300 in the IAB topology.

Topology structure information related to a structure of the IAB topology may be exchanged between the donor gNB 200-1 (CU) and a neighboring donor gNB 200-2 (CU) via an inter-base station interface.

The topology structure information may further include an identifier of each IAB node 300 constituting the IAB topology. The identifier includes at least one selected from the group consisting of an IAB identifier (BAP address), a DU identifier, and an MT identifier (Cell-Radio Network Temporary Identifier (C-RNTI)).

The topology structure information may further include the routing configuration information.

BH RLF Recovery Operation in Existing Specifications

In the IAB topology described above, a failure in the radio backhaul link (Radio Link Failure (RLF)) may occur. Such an RLF is referred to as a BH RLF.

Here, the BH RLF recovery operation in existing specifications (for example, see "3GPP TS 38.331 V16.1.0") will be described.

According to existing specifications, the IAB node 300 performs a series of processing (hereinafter referred to as "BH RLF recovery processing of existing specifications") from detecting a BH RLF to recovering from the BH RLF as follows, for example.

Firstly, in response to detecting an out of synchronization state (out-of-sync) N310 times in succession, the MT of the IAB node 300 detects a radio problem and starts a timer T310. In response to detecting a synchronization state (in-sync) N311 times in succession after starting the timer T310, the MT stops the timer T310.

Secondly, when the timer T310 expires without the MT having stopped the timer T310, the MT detects a BH RLF. In response to detection of the BH RLF, the MT initiates RRC reestablishment processing in order to recover from the BH RLF. The MT starts a timer T311 as well as initiates the RRC reestablishment processing and performs cell selection processing. The MT selects an appropriate cell by the cell selection processing and reestablishes a radio backhaul link with the selected cell. The appropriate cell refers to a cell that satisfies at least minimum radio quality standards.

Thirdly, when the timer T311 expires without the MT having been successful in reestablishment of the radio backhaul link, the MT transitions to the RRC idle state.

When the MT of the IAB node 300 fails in the RRC reestablishment processing (for example, when the timer T311 expires), the MT transmits a recovery failure notification to the child node of the IAB node 300. The recovery failure notification may be referred to as a BH RLF indication.

When the IAB node 300 receives the recovery failure notification from the parent node of the IAB node 300, the IAB node 300 initiates the RRC reestablishment processing in a manner the same as, and/or similar to when the IAB node 300 detects a BH RLF.

In the BH RLF recovery processing of existing specifications, the IAB node 300 transmits the recovery failure notification to the child node only when the IAB node 300 fails in the RRC reestablishment processing. In other words, from a detection of a BH RLF to the failure in the recovery, that is, while T311 is running, the IAB node 300 transmits no notifications about the BH RLF detected by the IAB node 300 to the child node of the IAB node 300. During this period, the child node may consider that the IAB node 300 operates normally and may transmit, to the IAB node 300, user data and a control signal addressed to the donor base station 200. If the IAB node 300 finally fails in the recovery from the BH RLF, these user data and control signal may not successfully reach the donor base station 200. Even if the recovery from the BH RLF succeeds before T311 expires, these user data and control signal cannot reach the donor base station 200 while T311 is running, and an upstream delay occurs. In existing specifications, a timer value of the T311 is up to 30 seconds, and the delay is thus up to 30 seconds.

As described above, the BH RLF recovery processing of existing specifications has a problem (hereinafter referred to as "problem 1") in that the child node of the IAB node 300 may consider that the IAB node 300 operates normally despite the fact that the IAB node 300 has detected a BH RLF. In particular, problem 1 is noticeable when the child node of the IAB node 300 relays traffic requiring a low delay.

A first embodiment to be described below is an embodiment related to a solution to problem 1.

In the BH RLF recovery processing of existing specifications, at the time when the IAB node 300 initiates the cell selection processing in the RRC reestablishment processing, the child node of the IAB node 300 operates normally. For example, the DU of the child node of the IAB node 300 continues transmission of a Synchronization Signal and PBCH block (SSB) being a downlink signal used for detection and measurement of a cell. Thus, when the IAB node 300 performs the cell selection processing in the RRC reestablishment processing, the IAB node 300 may detect a cell managed by the DU of the child node as an appropriate cell. However, the IAB node 300 does not include available radio backhaul links, and thus the child node cannot communicate with the donor base station 200. As a result, the IAB node 300 cannot reestablish RRC connection and thus cannot provide a relay function by using the IAB (hereinafter referred to as "problem 2"). In particular, problem 2 is noticeable when the IAB node 300 is located at a position physically close to the child node (radio state is satisfactory).

A second embodiment to be described below is an embodiment related to a solution to problem 2.

The BH RLF recovery processing of existing specifications does not take into consideration the fact that the MT of the IAB node 300 transitions to the RRC inactive state (problem 3).

A third embodiment to be described below is an embodiment related to a solution to problem 3.

First Embodiment

In the following, the first embodiment will be described. The first embodiment is an embodiment related to a solution to problem 1 described above.

The IAB node 300 according to the first embodiment performs recovery processing for recovering a radio backhaul link in response to an occurrence of an event related to a failure in the radio backhaul link. In initiating the RRC reestablishment processing as a part of the recovery processing, the IAB node 300 transmits failure information indicating the occurrence of the event to a lower node of the IAB node 300.

The event includes any one of an event in which the IAB node 300 detects a failure in the radio backhaul link (BH RLF) and an event in which the IAB node 300 receives the recovery failure notification from an upper node.

With this, the lower node of the IAB node 300 can recognize the occurrence of the event related to the failure in the radio backhaul link in the IAB node 300 when the RRC reestablishment processing is initiated in the IAB node 300.

The IAB node 300 may be configured to execute the RRC reestablishment processing and another processing (for example, fast MCG link recovery processing to be described below) that further facilitates recovery than the RRC reestablishment processing, as the recovery processing operations for recovering the radio backhaul link. In this case, the IAB node 300 does not perform the RRC reestablishment processing when the IAB node 300 succeeds in this another processing. Thus, the IAB node 300 transmits the failure information not at the time of initiating the recovery processing but at the time of initiating the RRC reestablishment processing.

Operation Example 1 of First Embodiment

Figure 9:
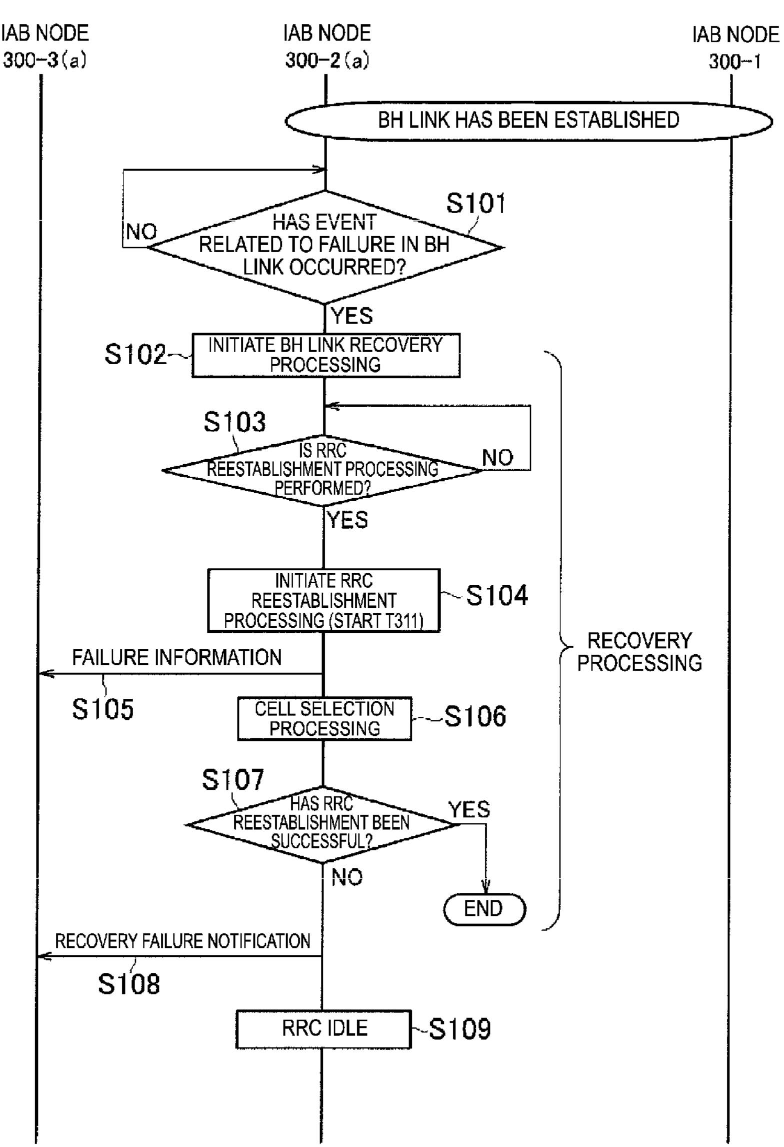
FIG. 9 is a diagram illustrating Operation Example 1 of a first embodiment.

In the following, Operation Example 1 of the first embodiment will be described. FIG. 9 is a diagram illustrating operation of Operation Example 1 of the first embodiment.

As illustrated in FIG. 9, the IAB node 300-2(*a*) initiates processing in a state in which the radio backhaul link (BH link) with the IAB node 300-1 is established. Although illustration is omitted, the MT of the IAB node 300-2(*a*) includes RRC connection with the CU of the donor gNB 200-1.

In Step S101, the IAB node 300-2(*a*) determines whether an event related to a failure in the radio backhaul link occurs. Here, the event includes any one of an event in which the IAB node 300-2(*a*) detects a BH RLF and an event in which the IAB node 300-2(*a*) receives, from the IAB node 300-1, the recovery failure notification indicating that the IAB node 300-1 fails in the recovery processing for recovering the radio backhaul link. The recovery processing refers to Step S102 to Step S107 to be described below.

When the IAB node 300-2(*a*) determines that the event occurs (S101: YES), the processing proceeds to Step S102.

In Step S102, the IAB node 300-2(*a*) initiates the recovery processing for recovering the radio backhaul link. Here, in a case that the IAB node 300-2(*a*) is configured to execute the RRC reestablishment processing and another processing (for example, the fast MCG link recovery processing) as the recovery processing operations, the IAB node 300-2(*a*) performs this another processing first.

In Step S103, the IAB node 300-2(*a*) determines whether to perform the RRC reestablishment processing. In a case that another processing is not configured, the IAB node 300-2(*a*) determines to perform the RRC reestablishment processing. When another processing is configured and the IAB node 300-2(*a*) fails in this another processing, the IAB node 300-2(*a*) determines to perform the RRC reestablishment processing.

When the IAB node 300-2(*a*) determines to perform the RRC reestablishment processing (S103: YES), the processing proceeds to Step S104.

In Step S104, the IAB node 300-2(*a*) initiates the RRC reestablishment processing (that is, starts the timer T311).

In Step S105, in initiating the RRC reestablishment processing, the IAB node 300-2(*a*) transmits failure information to a lower node (IAB node 300-3(*a*)) of the IAB node 300-2(*a*).

The failure information includes information indicating the event that is determined to have occurred in Step S101. The failure information may further include information indicating that the IAB node 300-2(*a*) initiates the RRC reestablishment processing.

The failure information may be a message of the BAP layer (BAP Control PDU) or may be a message of the MAC layer (MAC CE).

The failure information may be a message of the RRC layer. For example, the DU of the IAB node 300-2(*a*) may include the failure information in a system information block (SIB) to broadcast the failure information.

In Step S106, the IAB node 300-2(*a*) performs the cell selection processing. The IAB node 300-2(*a*) may perform the cell selection processing by using cell information in the second embodiment to be described below.

In Step S107, the IAB node 300-2(*a*) determines whether the RRC reestablishment processing is successful in the cell selected in the cell selection processing. If the RRC reestablishment processing is successful (S107: YES), the IAB node 300-2(*a*) ends the processing.

If the RRC reestablishment processing is failed (S107: NO), the IAB node 300-2(*a*) transmits the recovery failure notification to the IAB node 300-3(*a*) in Step S108.

In Step S109, the IAB node 300-2(*a*) transitions from the RRC connected state to the RRC idle state.

Operation Example 2 of First Embodiment

Operation Example 2 is an operation example related to a case in which the IAB node 300 includes a plurality of radio backhaul links (for example, an MCG link and an SCG link) and an event related to a failure in one radio backhaul link (for example, the MCG link) occurs.

In response to an occurrence of an event related to a failure in one radio backhaul link (for example, the MCG link), the IAB node 300 according to Operation Example 2 performs processing for recovering the one radio backhaul link via the other radio backhaul link (for example, the SCG link). When the processing is failed, the IAB node 300 performs the RRC reestablishment processing. The processing is, for example, the fast MCG link recovery processing (Fast MCG link recovery procedure). In the following, the fast MCG link recovery processing will be described.

Firstly, the MT of the IAB node 300 generates an MCGFailureInformation message and transmits the MCGFailureInformation message to the CU of the donor gNB 200-1 via the SCG link. In transmitting the MCGFailureInformation message, the MT starts a timer T316 related to the fast MCG link recovery processing.

Secondly, the MT of the IAB node 300 receives an RRC message (for example, an RRC Reconfiguration message) for recovering the MCG link, from the CU of the donor gNB 200-1 via the SCG link. The RRC message includes a Contention-free random access preamble used for a random access procedure on the IAB node 300 being a parent node corresponding to the MCG link and a radio configuration used for wireless communication with the IAB node 300. The MT of the IAB node 300 recovers the MCG link in response to the reception of the RRC message.

Thirdly, when the timer T316 expires without the MT having received the RRC message for recovering the MCG link, the MT performs the RRC reestablishment processing.

Figure 10:
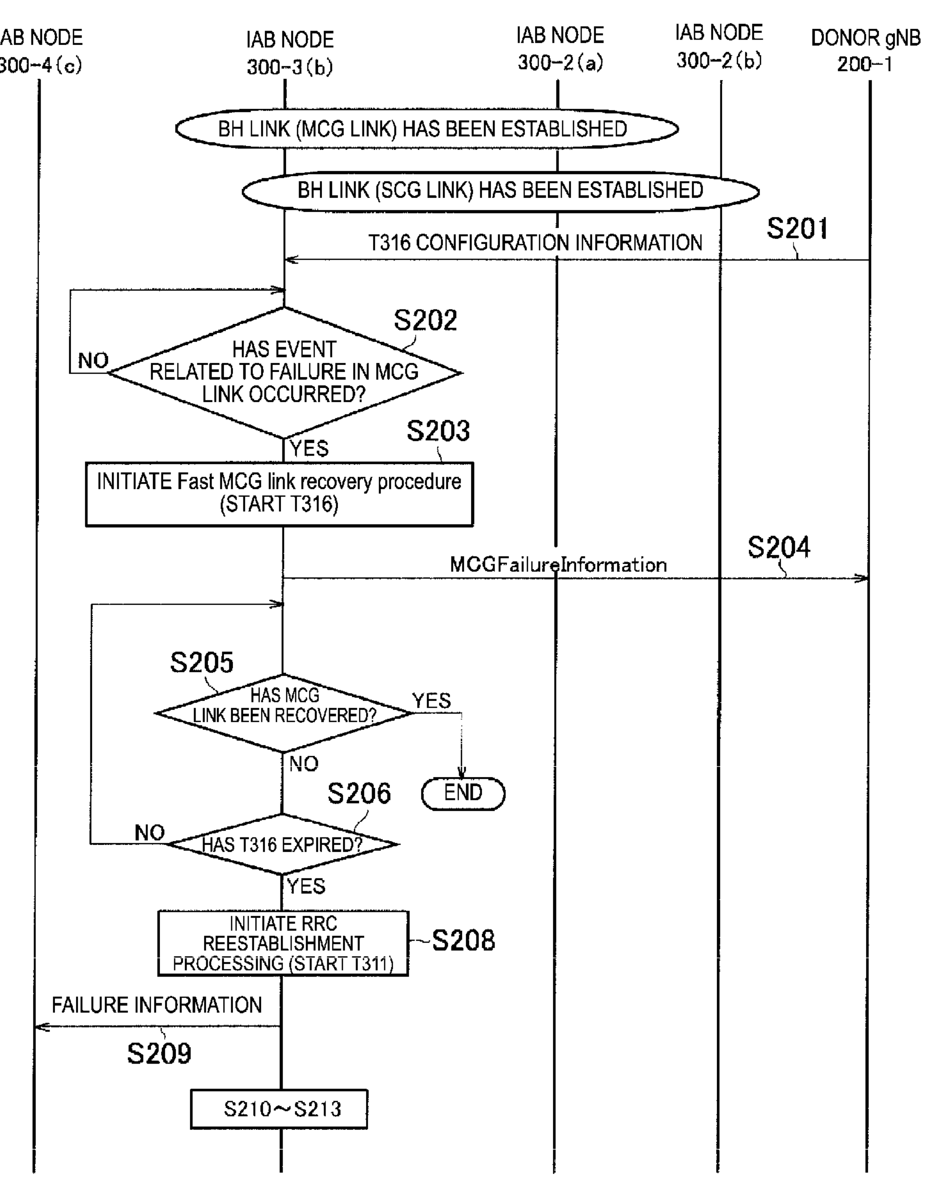
FIG. 10 is a diagram illustrating Operation Example 2 of the first embodiment.

In the following, operation of Operation Example 2 will be described. FIG. 10 is a diagram illustrating operation of Operation Example 2.

As illustrated in FIG. 10, the IAB node 300-3(*b*) initiates the operation in a state in which the MCG link being a radio backhaul link with the IAB node 300-2(*a*) and the SCG link being a radio backhaul link with the IAB node 300-2(*b*) are established. The MT of the IAB node 300-3(*b*) includes RRC connection with the CU of the donor gNB 200-1.

In Step S201, the IAB node 300-3(*b*) receives an RRC message including configuration information of the timer T316 from the donor gNB 200-1. By receiving the configuration information of the timer T316, the IAB node 300-3(*b*) recognizes that the IAB node 300-3(*b*) executes of the fast MCG link recovery procedure when an event related to a failure in an MCG link occurs.

In Step S202, the IAB node 300-3(*b*) determines whether the event related to the failure in the MCG link occurs. The event includes any one of an event in which the IAB node 300-3(*b*) detects a BH RLF in the MCG link and an event in which the IAB node 300-3(*b*) receives, from the IAB node 300-2(*a*), the recovery failure notification indicating that the IAB node 300-2(*a*) fails in the recovery processing for recovering the radio backhaul link.

When the IAB node 300-3(*b*) determines that the event occurs (S202: YES), the processing proceeds to Step S203.

In Step S203, the IAB node 300-3(*b*) initiates the fast MCG link recovery processing (that is, starts the timer T316).

In Step S204, the IAB node 300-3(*b*) transmits the MCGFailureInformation message to the donor gNB 200-1 via the SCG link.

In Step S205, the IAB node 300-3(*b*) determines whether the recovery of the MCG link has been successful (that is, whether the IAB node 300-3(*b*) has received the RRC message for recovering the MCG link). If the recovery of the MCG link has been successful (S205: YES), the IAB node 300-3(*b*) stops the timer T316 and ends the present operation flow.

If the recovery of the MCG link is not successful (S205: NO), the IAB node 300-3(*b*) determines whether the timer T316 expires in Step S206. When the timer T316 expires (Step S206: YES), the IAB node 300-3(*b*) determines that the fast MCG link recovery processing is failed, and the processing proceeds to Step S208.

In Step S208, the IAB node 300-3(*b*) initiates the RRC reestablishment processing (that is, starts the timer T311).

In Step S209, in initiating the RRC reestablishment processing, the IAB node 300-3(*b*) transmits failure information to a lower node (IAB node 300-4(*c*)). The failure information includes information indicating the event that is determined to have occurred in Step S202. The failure information may further include information indicating that the IAB node 300-3(*b*) initiates the RRC reestablishment processing.

The processing operations of Steps S210 to S213 are the same as the processing operations of Steps S106 to S109. Here, the "IAB node 300-2(*a*)" in Steps S106 to S109 is replaced with the "IAB node 300-3(*b*)".

Second Embodiment

The second embodiment is an embodiment related to a solution to problem 2 described above.

The IAB node 300 according to the second embodiment receives, from the donor gNB 200, cell information used in performing a cell selection procedure for determining a target cell to reestablish the radio backhaul link. The IAB node 300 stores the cell information. When the IAB node 300 initiates the RRC reestablishment processing, the IAB node 300 performs the cell selection processing by using the stored cell information.

The cell information includes any one of allowed cell information identifying an allowed cell being a cell that is allowed to be selected as a target cell by the IAB node 300 and not-allowed cell information identifying a not-allowed cell being a cell that is not allowed to be selected as a target cell by the IAB node 300.

The allowed cell of the IAB node 300 includes at least one type of cell selected from the group consisting of a type 1 allowed cell, a type 2 allowed cell, and a type 3 allowed cell.

The type 1 allowed cell of the IAB node 300 is a cell managed by a different IAB node 300 that includes a relay path with the donor gNB 200 to which the IAB node 300 belongs and that does not include the IAB node 300 on its relay path. In the example of FIG. 8, the type 1 allowed cell of the IAB node 300-2(*a*) includes a cell managed by the IAB node 300-1 and a cell managed by the IAB node 300-2(*b*).

The type 2 allowed cell of the IAB node 300 is a cell managed by a different IAB node 300 that includes a relay path with the donor gNB 200 to which the IAB node 300 belongs, includes the IAB node 300 on its relay path, and includes a relay path different from the relay path. In the example of FIG. 8, the type 2 allowed cell of the IAB node 300-2(*a*) includes a cell managed by the IAB node 300-3(*b*) and a cell managed by the IAB node 300-4(*c*).

The type 3 allowed cell of the IAB node 300 is a cell managed by a different IAB node 300 under control of a donor gNB 200 (CU) different from the donor gNB 200 (CU) to which the IAB node 300 belongs. The type 3 allowed cell may be referred to as a different topology cell.

The not-allowed cell of the IAB node 300 is a cell managed by a different IAB node 300 that includes only one relay path with the donor gNB 200 to which the IAB node 300 belongs and that includes the IAB node 300 on its relay path. In the example of FIG. 8, the not-allowed cell of the IAB node 300-2(*a*) includes a cell managed by the IAB node 300-3(*a*), a cell managed by the IAB node 300-4(*a*), and a cell managed by the IAB node 300-4(*b*).

The cell selection processing using the cell information will be described.

When the IAB node 300 detects the type 1 allowed cell in the cell selection processing, the IAB node 300 selects the type 1 allowed cell as a target cell.

When the IAB node 300 does not detect the type 1 allowed cell and detects the type 2 allowed cell, the IAB node 300 selects the type 2 allowed cell as a target cell.

When the IAB node 300 detects neither the type 1 allowed cell nor the type 2 allowed cell and detects the type 3 allowed cell, the IAB node 300 selects the type 3 allowed cell as a target cell. Here, when the IAB node 300 reestablishes a radio backhaul link with the different topology cell, the child node of the IAB node 300 needs to establish RRC connection with a donor gNB 200 to which the different topology cell belongs. Thus, the type 2 allowed cell is preferentially selected over the type 3 allowed cell (different topology cell).

When the IAB node 300 detects none of the type 1 allowed cell to the type 3 allowed cell, the IAB node 300 does not select a target cell. In this case, T311 expires, and the IAB node 300 transitions to the RRC idle state and discards the stored cell information.

The IAB node 300 determines the detected cell as any one of the type 1 allowed cell, the type 2 allowed cell, the type 3 allowed cell, and the not-allowed cell by using a determination method described below.

Case 1

Case 1 is a case in which the IAB node 300 has stored the allowed cell information. The determination method in case 1 is as follows.

The IAB node 300 determines a cell included in the allowed cell information as the type 1 allowed cell.

The IAB node 300 determines a cell that is not included in the allowed cell information and that broadcasts IAB topology information not matching IAB topology information of the IAB node 300 as the type 3 allowed cell. The IAB topology information may be an identifier of the donor gNB 200 or may be an identifier of the IAB topology.

The IAB node 300 determines a cell that is not included in the allowed cell information and that broadcasts IAB topology information matching IAB topology information of the IAB node 300 as the not-allowed cell.

The IAB node 300 determines a cell that is not included in the allowed cell information and that is managed by a different IAB node 300 having duplex connection and configuring the IAB node 300 as a node (MN or SN) of the duplex connection, as the type 2 allowed cell. The IAB node 300 recognizes in advance a cell managed by a different IAB node 300 having duplex connection and configuring the IAB node 300 as a node of the duplex connection, by an F1-AP message or an RRC message.

The allowed cell information may include type information indicating a cell identifier and a type (any one of type 1 to type 3) of a cell corresponding to the cell identifier. In this case, the IAB node 300 determines the detected cell as any one of the type 1 allowed cell, the type 2 allowed cell, and the type 3 allowed cell, based on the type information included in the allowed cell information.

The donor gNB 200-1 (CU) includes the topology structure information of the neighboring donor gNB 200-2 (CU) and can thus identify a type 3 allowed cell for the IAB node 300 and include information on the type 3 allowed cell for the IAB node 300 in the allowed cell information.

Case 2

Case 2 is a case in which the IAB node 300 has stored the not-allowed cell information. The determination method in case 2 is as follows.

The IAB node 300 determines a cell included in the not-allowed cell information as the not-allowed cell.

The IAB node 300 determines a cell as the type 2 allowed cell as long as the cell is managed by a different IAB node 300 having duplex connection and configuring the IAB node 300 as a node of the duplex connection, even if the cell is included in the not-allowed cell information.

The IAB node 300 determines a cell that broadcasts IAB topology information not matching IAB topology information of the IAB node 300 as the type 3 allowed cell.

The IAB node 300 determines a cell that is not included in the not-allowed cell information and that broadcasts IAB topology information matching IAB topology information of the IAB node 300 as the type 1 allowed cell.

The IAB node 300 determines a cell that is not included in the not-allowed cell information and that broadcasts IAB topology information not matching IAB topology information of the IAB node 300 as the type 3 allowed cell.

Operation Example of Second Embodiment

Figure 11:
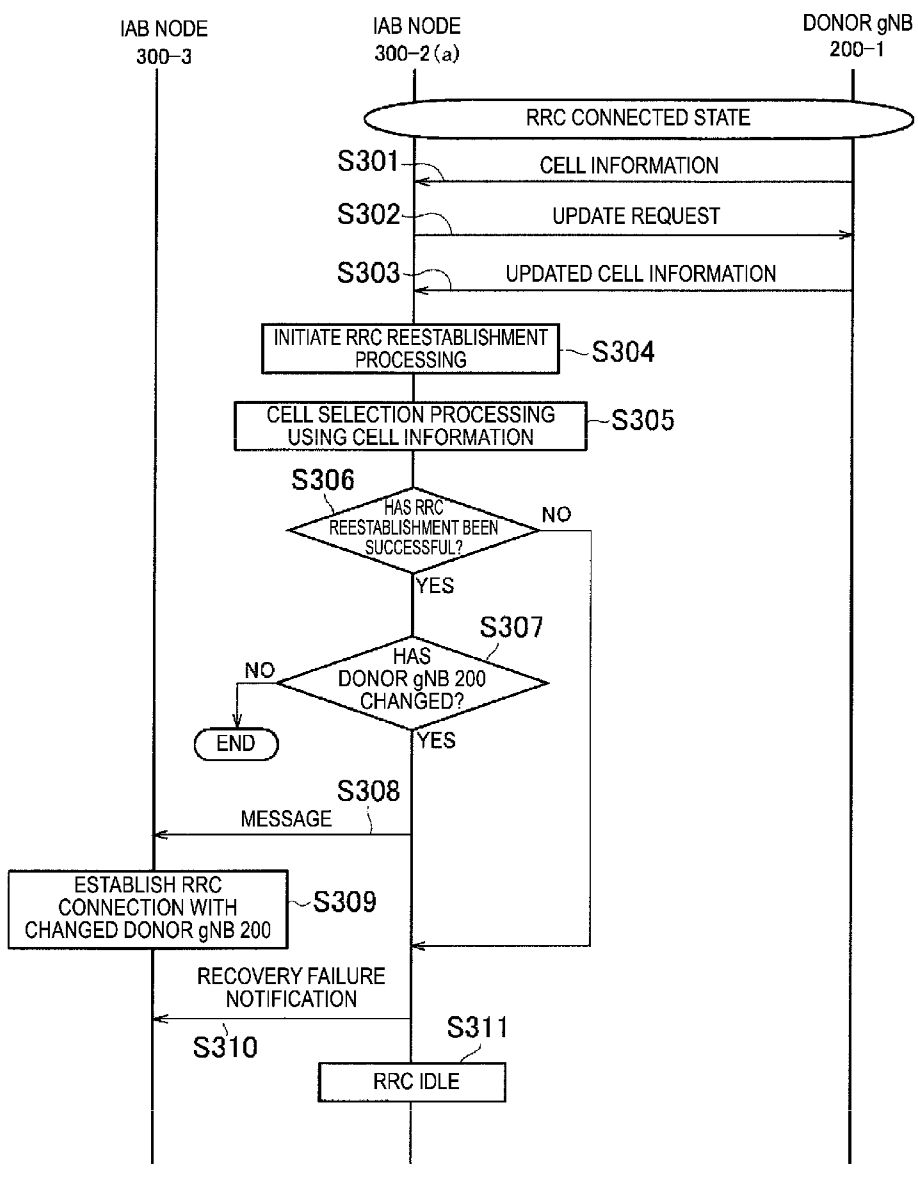
FIG. 11 is a diagram illustrating Operation Example of a second embodiment.

In the following, Operation Example of the second embodiment will be described. FIG. 11 is a diagram illustrating Operation Example of the second embodiment.

As illustrated in FIG. 11, the IAB node 300-2(*a*) initiates processing in a state of having RRC connection with the donor gNB 200-1.

In Step S301, the donor gNB 200-1 transmits cell information to the IAB node 300-2(*a*). The IAB node 300-2(*a*) receives the cell information from the donor gNB 200-1 and stores the received cell information. The cell information includes any one of the allowed cell information and the not-allowed cell information.

The donor gNB 200-1 determines information (the allowed cell information or the not-allowed cell information) to be included in the cell information, based on the number of hops from the IAB node 300-2(*a*) to the donor gNB 200-1.

When the number of hops is equal to or greater than a threshold value, the donor gNB 200-1 includes the not-allowed cell information in the cell information. When the number of hops is less than the threshold value, the donor gNB 200-1 includes the allowed cell information in the cell information. For the IAB node 300 with a large number of hops, the number of lower nodes is less than the number of upper nodes, and thus the number of not-allowed cells is less than the number of allowed cells and the size of the allowed cell information is greater than the size of the not-allowed cell information. In contrast, for the IAB node 300 with a small number of hops, the size of the not-allowed cell information is greater than the size of the allowed cell information. Determining the information to be included in the cell information through a comparison between the number of hops and the threshold value allows the size of the information to be reduced.

In transmitting the cell information, the donor gNB 200-1 may configure a period of validity for the cell information. Specifically, the donor gNB 200-1 transmits the cell information together with information indicating a timer value corresponding to the period of validity. When the IAB node 300-2(*a*) receives the cell information together with the timer value, the IAB node 300-2(*a*) stores the cell information and starts the timer. In response to expiry of the timer, the IAB node 300-2(*a*) discards the stored cell information.

In Step S302, the IAB node 300-2(*a*) transmits an update request message for requesting update of the cell information to the donor gNB 200-1. The update request message is an RRC message.

When any one of the following conditions A and B is satisfied, the IAB node 300-2(*a*) may transmit the update request message.

Condition A: The timer started by the IAB node 300-2(*a*) in response to the reception of the cell information expires.

Condition B: The IAB node 300-2(*a*) discovers a cell not identified by the cell information.

Here, for example, the IAB node 300-2(*a*) performs measurement according to measurement configuration information configured from the donor gNB 200-1, and when the cell discovered in the measurement is not included in the cell information, the IAB node 300-2(*a*) determines that condition B is satisfied.

The update request message transmitted by the IAB node 300-2(*a*) according to condition B may be an inquiry message including an inquiry about whether the discovered cell is the allowed cell or the not-allowed cell. The inquiry message includes the cell identifier of the discovered cell.

In Step S303, the donor gNB 200-1 transmits the updated cell information to the IAB node 300-2(*a*). The IAB node 300-2(*a*) receives the updated cell information and updates the stored cell information.

The updated cell information may be new cell information or may be information indicating a difference with respect to the previously transmitted cell information (cell information transmitted in Step S301). The information indicating the difference is, for example, information including a cell identifier newly added to the previously transmitted cell information (the allowed cell information or the not-allowed cell information).

In Step S303, even if the donor gNB 200-1 does not receive the update request message from the IAB node 300-2(*a*), the donor gNB 200-1 may transmit the updated cell information when any one of the following conditions C and D is satisfied.

Condition C: A change is made to IAB topology under control of the donor gNB 200-1.

For example, when a new IAB node 300 joins IAB topology or when an IAB node 300 in IAB topology leaves the IAB topology, the donor gNB 200-1 determines that condition C is satisfied.

Condition D: A measurement report according to measurement configuration from the donor gNB 200-1 is received from the IAB node 300-2(*a*), and the measurement report includes a cell identifier of a cell not configured in the measurement configuration.

In Step S304, the IAB node 300-2(*a*) initiates the RRC reestablishment processing (that is, starts the timer T311).

In Step S305, the IAB node 300-2(*a*) performs the cell selection processing using the cell information. Here, the IAB node 300-2(*a*) performs the cell selection processing based on the cell selection method described above.

In Step S306, the IAB node 300-2(*a*) determines whether the RRC reestablishment processing is successful for the cell selected in the cell selection processing. If the RRC reestablishment processing is successful (S306: YES), the IAB node 300-2(*a*) proceeds the processing to Step S307. In contrast, if the RRC reestablishment processing is failed (S306: NO), the IAB node 300-2(*a*) proceeds the processing to Step S310.

In Step S307, the IAB node 300-2(*a*) determines whether the donor gNB 200 to which the IAB node 300-2(*a*) belongs is changed. Here, when the IAB node 300-2(*a*) selects the different topology cell (type 3 allowed cell) as a target cell in Step S305 and then succeeds in the RRC reestablishment processing for the cell, the IAB node 300-2(*a*) determines that the donor gNB 200 is changed.

If the IAB node 300-2(*a*) determines that the donor gNB 200 is changed (S307: YES), the processing proceeds to Step S308. In contrast, if the IAB node 300-2(*a*) determines that the donor gNB 200 to which the IAB node 300-2(*a*) belongs is not changed (S307: NO), the processing ends.

In Step S308, the IAB node 300-2(*a*) transmits, to the IAB node 300-3 under control of the IAB node 300-2(*a*), a message for causing the IAB node 300-3 to execute processing for establishing RRC connection with the changed donor gNB 200. The processing is RRC reestablishment processing or handover processing. The message is a BAP message (BAP Control PDU) or an RRC message (SIB). In Step S309, the IAB node 300-3 performs the RRC reestablishment processing or the handover processing in response to the message received in Step S308.

The IAB node 300-3 may not execute a random access procedure in the RRC reestablishment processing or the handover processing. In other words, the IAB node 300-3 performs RACH-less RRC reestablishment processing or RACH-less handover processing. In this case, the IAB node 300-3 transmits MSG3 without transmitting MSG1 (Random Access Preamble). The message in Step S308 may include an indication indicating RACH-less.

In Step S310, the IAB node 300-2(*a*) transmits the recovery failure notification to the IAB node 300-3.

In Step S311, the IAB node 300-2(*a*) transitions from the RRC connected state to the RRC idle state.

In the second embodiment, the IAB node 300 may be provided with cell information by the parent node. The cell information may be received from the parent node together with the "failure information" in the first embodiment. The cell information may be included in the failure information.

Third Embodiment

The third embodiment is an embodiment related to a solution to problem 3 described above.

The IAB node 300 according to the third embodiment transitions to the RRC inactive state in response to an instruction message received from an upper node.

The IAB node 300 in the RRC inactive state performs RRC resume processing (RRC resume procedure), and thereby recovers the radio backhaul link. The RRC resume processing does not require recovery of NAS, and thus further facilitates recovery of the radio backhaul link than the RRC reestablishment processing.

Figure 12:
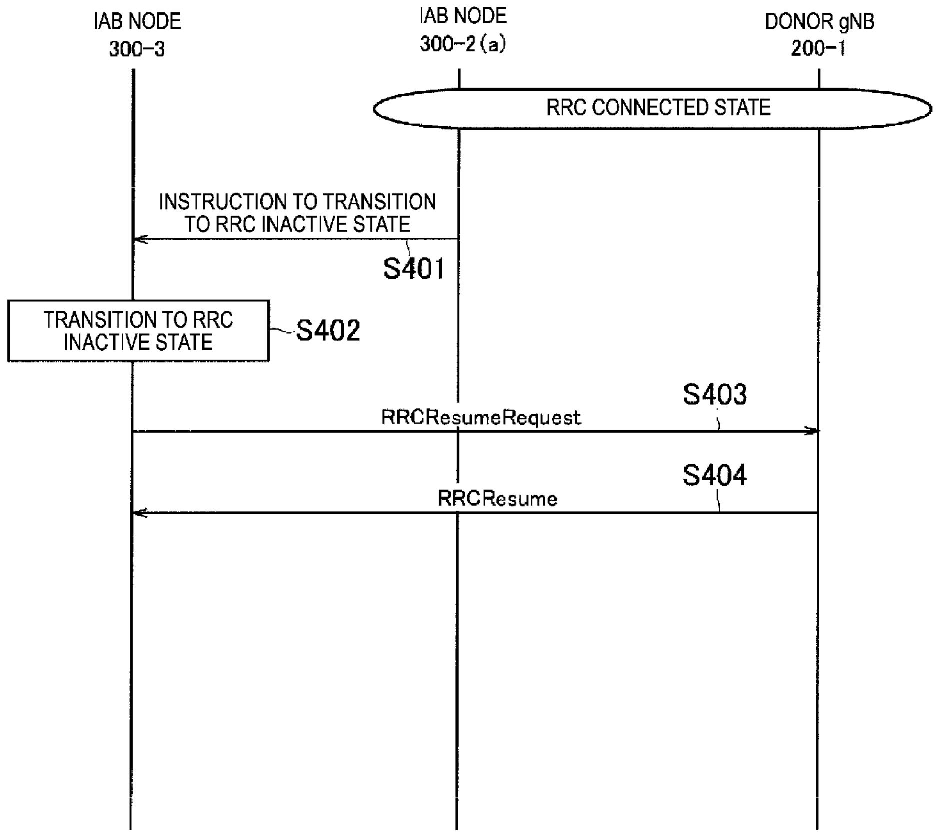
FIG. 12 is a diagram illustrating Operation Example of a third embodiment.

In the following, Operation Example of the third embodiment will be described. FIG. 12 is a diagram illustrating Operation Example of the third embodiment.

As illustrated in FIG. 12, the IAB node 300-2(*a*) initiates processing in a state of having RRC connection with the donor gNB 200-1.

In Step S401, the IAB node 300-2(*a*) transmits, to the IAB node 300-3 under control of the IAB node 300-2(*a*), an instruction message for the IAB node 300-3 to transition to the RRC inactive state. The instruction message may be a BAP message (BAP Control PDU) or may be an RRC message (SIB).

When the IAB node 300-2(*a*) is no longer able to secure connection with the donor gNB 200-1, the IAB node 300-2(*a*) may transmit the instruction message. The expression "the IAB node 300-2(*a*) is no longer able to secure connection with the donor gNB 200-1" refers to any one of a case in which the "event related to the failure in the radio backhaul link" described above occurs in the IAB node 300-2(*a*) and a case in which the IAB node 300-2(*a*) receives the "failure information" described above from an upper node.

In Step S402, the IAB node 300-3 transitions to the RRC inactive state in response to the received instruction message.

The IAB node 300-3 may perform cell reselection immediately after transitioning to the RRC inactive state. In cell reselection, the IAB node 300-3 does not select a serving cell immediately before the transition (that is, a cell managed by the IAB node 300-2(*a*)). The IAB node 300-2(*a*) transmits the instruction message when the IAB node 300-2(*a*) is no longer able to secure connection with the donor gNB 200-1, and thus if the IAB node 300-3 selects the serving cell immediately before the transition, the IAB node 300-3 is unlikely to be able to communicate with the donor gNB 200-1. Thus, the IAB node 300-3 does not select the serving cell immediately before the transition.

In Step S403, the IAB node 300-3 transmits an RRCResumeRequest message to the donor gNB 200-1.

The RRCResumeRequest message includes at least one selected from the group consisting of a cell identifier of the serving cell immediately before the transition, C-RNTI, and Short MAC-I. Based on these pieces of information, the donor gNB 200-1 can acquire a context of the IAB node 300-3.

The RRCResumeRequest message may further include a Resume Cause indicating securing of the radio backhaul link.

In Step S404, the IAB node 300-3 receives an RRCResume message from the donor gNB 200-1. The RRCResume message includes NCC. The NCC is information for deriving a security key referred to as KgNB.

Other Embodiments

A program may be provided that causes a computer to execute each of the processing operations performed by the IAB node 300 or the donor gNB 200. The program may be recorded in a computer-readable medium. Use of the computer readable medium enables the program to be installed on a computer. Here, the computer readable medium on which the program is recorded may be a non-transitory recording medium. The non-transitory recording medium is not particularly limited and may be, for example, a recording medium such as a CD-ROM and a DVD-ROM.

A circuit for executing each of the processing operations performed by the IAB node 300 or the donor gNB 200 may be integrated, and at least a part of the IAB node 300 or the donor gNB 200 may be configured as a semiconductor integrated circuit (a chipset or an SoC).

Embodiments have been described above in detail with reference to the drawings, but specific configurations are not limited to those described above, and various design modifications and the like can be made without departing from the gist.

The embodiments and variations described above provide description by taking relay transmission performed by the IAB as an example but are not limited to this. The embodiments and variations described above may be applied to other relay transmission systems. For example, operations according to the embodiments and variations described above may be applied to a relay node (layer 3 relay node), sidelink relay (relay node that uses a sidelink used for direct communication between user equipments), and the like.

In the embodiment described above, an example has been mainly described, in which the cellular communication system 1 is a 5G cellular communication system. However, the base station in the cellular communication system 1 may be an eNB that is an LTE base station. The core network in the cellular communication system 1 may be an Evolved Packet Core (EPC). The gNB can be connected to the EPC, the eNB can be connected to the SGC, and the gNB and the eNB may be connected via an inter-base station interface (Xn interface or X2 interface).

Supplementary Notes

Introduction

A revised work item related to Enhancements to Integrated Access and Backhaul (NR eIAB) was approved. Some of the purposes thereof are as follows.

Enhancements of Topology Adaptation

- Specification of procedures for inter-donor IAB-node migration to enhance robustness and load-balancing, including enhancements to reduce signaling load.
- Specification of enhancements to reduce service interruption due to IAB-node migration and BH RLF recovery.
- Specification of enhancements to topology redundancy, including support for CP/UP separation. Enhancements of topology, routing, and transport.
- Specification of enhancements to improve topology-wide fairness, multi-hop latency, and congestion mitigation.

In Supplementary Notes, a first matter to be considered regarding the topology adaptation enhancements of a Rel-17 eIAB will be discussed from the viewpoint of assumption of backhaul link quality, enhancements of BH RLF indication, BH RLF recovery and cell (re)selection, and enhancements of lossless delivery.

Discussion

Assumption of Backhaul Link Quality

In the stage of research of Rel-15, as one requirement background, TR states the following: "Radio backhaul links are vulnerable to obstructions caused by a moving object such as a vehicle, change of seasons (leaves), change of infrastructure (new buildings), and the like. Such vulnerability is true for physically motionless IAB nodes as well". Thus, as has been captured in TR, various problems caused by multi-hop/radio backhaul and potential solutions for these problems were researched.

Finding 1: In the research of Rel-15, various problems caused by unstable backhaul links and potential solutions for these problems were identified, which were fully captured in TR 38.874.

In normative work of Rel-16, it was assumed that the IAB nodes are motionless, that is, "stationary IAB nodes". Accordingly, the backhaul (BH) was sufficiently stable in appropriately designed deployment even in a case of a backhaul link via millimeter waves and/or a local area IAB node that may be deployed with an unmanaged method. Thus, only a recovery procedure combined with basic functions of the BH RLF was defined. The basic functions are existing functions such as BH RLF indication (also known as type 4 that is "Recovery failure") and RRC reestablishment, MCG/SCG failure indication, and/or a conditioned handover.

Finding 2: In a Rel-16 IAB, only a stationary IAB node including a sufficiently stable backhaul link was assumed.

In enhancements of Rel-17, one intended use case is a "mobile IAB node", which may be a part of "inter-donor IAB-node migration" even if not explicitly described in WID. Secondary purposes in WID such as "enhancements to reduce service interruption due to IAB-node migration and BH RLF recovery" and "enhancements to topology redundancy" clearly intend that the BH link is not stable, and the migration and the BH RLF frequently occur in a Rel-17 deployment scenario. Therefore, according to the discussion of Rel-17, first, RAN2 should have common understanding about assumption of the BH link.

Proposal 1: RAN2 should assume that quality of the backhaul link dynamically changes. Thus, a backhaul RLF is not rare as with the Rel-17 eIAB.

Enhancements of BH RLF Indication In email discussion of Rel-16, four types of BH RLF notifications as illustrated in FIG. 13 were discussed.

Ultimately, only "Recovery failure" being type 4 is defined as the BH RLF indication of Rel-16. With this, a child IAB-MT considers an RLF on the BH link and initiates an RLF recovery procedure.

Finding 3: In Rel-16, only "Recovery failure" being type 4 was defined as the BH RLF indication.

On the other hand, a number of companies were still considering that other types of indications were useful, and thus this was further discussed via email. Eight out of thirteen companies preferred introduction of "Trying to recover" being type 2, and other two companies thought this would be discussed in Rel-17. Accordingly, it can be assumed that a large number of companies consider that they are prepared to introduce the indication of type 2 to Rel-17. A method for transmitting the indication of type 2 requires further study. Examples of the method include using the BAP Control PDU, the SIB1, or both of these. Note that type 1 and type 2 have completely the same meaning.

Proposal 2: RAN2 should agree with the fact that "Trying to recover" being type 2 of the BH RLF indication has been introduced. Whether the transmission is performed using the BAP Control PDU, the SIB1, or both of these requires further study.

Nine out of thirteen companies agreed to hold a discussion on "BH link recovered" being type 3 in Rel-17 as well. Specifically, such an explicit indication is really needed can be studied. For example, when the indication of type 2 is transmitted via the SIB1 and the BH link is not under the RLF (i.e., "recovered"), the indication is no longer broadcast. Accordingly, downstream IAB nodes and the UE shall recognize whether the BH link has been recovered based on the absence of indication of type 2 on the SIB1. As a matter of course, when the indication of type 3 is transmitted via the BAP Control PDU, it has an advantage that the downstream IAB nodes can promptly know that the BH link has been recovered. Note that, in this case, the UE does not include the BAP layer and thus cannot know the fact. Therefore, RAN2 should discuss whether the indication of type 3 is necessary.

Proposal 3: If Proposal 3 can be agreed on, RAN2 should discuss whether to introduce an explicit BH RLF indication, that is "BH link recovered" being type 3, when the BH RLF is no longer present.

If Proposal 2 and/or Proposal 3 can be agreed on, operation during recovery of the BH link of the IAB-MT that has received the indication should be studied. The following was proposed: when the IAB-MT receives type 2, the IAB-MT reduces/stops the SR, and when the IAB-MT receives type 3 (i.e., the BH RLF is no longer present in a parent IAB node), the IAB-MT resumes operation. This is one desirable operation of the IAB-MT when the parent node is trying to recover the BH link. It is assumed that other operations of the IAB-MT, such as operation of suspending all of the RBs, are also possible.

Proposal 4: RAN2 should agree with that the IAB-MT, who has received the indication of type 2 and then reduced/stopped the scheduling request, resumes the scheduling request when the BH RLF is no longer present in the parent node.

Proposal 5: RAN2 should have a discussion about when an operation of other IAB-MT is present while the parent node is trying to recover the BH link.

While the BH link of the IAB node is under the RLF, it is assumed that the IAB-DU, which transmits an indication, transmits the BH RLF indication of type 2. When an RLF occurs in the BH link, an indication is transmitted, and thus a case of the BH of single connection is easy. However, a case of the BH with duplex connection is slightly more complicated. For example, when the IAB node detects an RLF in the MCG, the IAB node initiates an MCG failure information procedure; however, the SCG continues to function as a BH link, and therefore the indication of type 2 may not need to be transmitted at this time. When the MCG failure information procedure fails due to expiry of T316 or the like, the IAB-MT initiates RRC reestablishment, and therefore at this time, the indication of type 2 is transmitted. Thus, the indication of type 2 is transmitted when RRC reestablishment is initiated, not when the MCG/SCG failure information is triggered. In any case, because this concerns operation of the IAB-DU, whether to capture this in a specification/how to capture this should be carefully studied. That is, whether to add notes in stage 2 or stage 3 or nothing needs to be captured should be studied.

Proposal 6: RAN2 should agree on the fact that the BH RLF indication of type 2 may be transmitted when the IAB-DU initiates RRC reestablishment, not when the IAB-DU initiates any of the RLF recovery procedures.

Proposal 7: RAN2 should discuss whether to capture the operation of the IAB-DU (i.e., Proposal 6) in a specification/how to capture the operation.

Enhancements of BH RLF Recovery and Cell (Re)selection

In an RRC reestablishment procedure, the IAB-MT first executes a cell selection procedure in order to find an appropriate cell. In the cell selection procedure, potential problems were pointed out in Rel-16, such as one that the IAB-MT may select its descendant node. Thus, this was discussed in email discussion.

As illustrated in FIG. 14, possible five solutions were discussed and summarized together with the rapporteur's view.

The conclusion was that "no further action is taken on this topic in Rel-16". This means that RAN2 agreed on "Option 4: Nothing needed since RRC Reestablishment will fail if there is no BH connectivity". Option 4 requires waiting for a failure (expiry of T301) and finally going to an idle state and was thus acceptable in a Rel-16 deployment scenario even when further time is required for BH RLF recovery.

Finding 4: In Rel-16, when the IAB node attempts an RRC reestablishment request to the descendant node, the IAB node needs to wait for a failure of the attempt, and finally go to an idle state.

In Rel-17, from the viewpoint of Proposal 1, cell (re) selection and RRC reestablishment may frequently occur. Thus, suboptimal operation, that is, operation in accordance with Finding 4, shall cause significant deterioration in performance from the viewpoint of stability of the IAB topology and service continuity. Thus, in order to optimize the operation of the IAB-MT during BH RLF recovery, "the topic can be discussed again in Rel-17", as stated by the rapporteur of the above email discussion.

Proposal 8: RAN2 should agree on study on optimization of cell (re)selection in order to avoid reestablishment to an inappropriate node (for example, a descendant node).

It may be assumed that a common concept in the solutions identified except for Option 4 above is that the IAB-MT is provided with a type of either a whitelist or a blacklist for the purpose of cell selection. For example, given that topology changes may frequently occur in Rel-17 due to "inter-donor IAB-node migration", the whitelist and the blacklist have advantages and disadvantages depending on the topology and the positions of the IAB nodes.

For example, from the viewpoint of an IAB node close to an IAB donor, that is, the uppermost in DAG topology, because the number of candidate nodes is small, and in some cases only an IAB donor DU, providing the whitelist is more reasonable.

However, in another example as a viewpoint of an IAB node very distant from an IAB donor, that is, the lowest in DAG topology, a great number of candidate nodes may need to be included in the whitelist. Instead, for example, a blacklist includes only downstream IAB nodes of the IAB node to be concerned and in some cases includes only a small number of child IAB nodes, and thus in this case, it has an advantage that overhead is small.

One matter of concern of the whitelist is that, due to the property of "inter-donor IAB-node migration" of Rel-17, candidate IAB nodes belonging to different/adjacent IAB topology may need to be included, which may result in increasing the size of the list. On the other hand, needless to say, downstream IAB nodes belong to the same IAB topology, and thus the blacklist need not consider the matter.

Finding 5: The whitelist and the blacklist have advantages and disadvantages depending on the topology and the positions of the IAB nodes.

Thus, when information is provided to the child IAB node for the purpose of cell selection, the IAB donor (or the parent IAB node) is desirable to be able to select either the whitelist or the blacklist. Note that the information may be useful if being reused for the purpose of cell reselection.

Proposal 9: RAN2 should agree on provision of the whitelist or the blacklist (i.e., selection structure) to the IAB-MT for the purpose of cell selection in order to avoid reestablishment to a descendant node. Whether these lists can also be used for a cell reselection procedure requires further study.

If Proposal 9 can be agreed on, a method of providing the information, that is, the whitelist or the blacklist, should be further studied. Option 1 assumes CHO configuration, and some enhancements may be required. Option 2 assumes additional indications, examples include the BH RLF indication of type 2. Option 3 assumes provision of information of the overall topology, which is not present in the existing configuration. Option 5 assumes OAM-based configuration; however, this is questionable as the rapporteur pointed out.

Considering again the assumption of Rel-17 (i.e., Proposal 1), that is, the fact that the parent IAB node or the IAB donor should provide a list to the child IAB node in case of occurrence of topology change, the method of providing the whitelist/blacklist should be a dynamic method. Thus, Option 5, that is, OAM, should be excluded. Which method, that is, which method out of Options 1, 2, and 3, is to be used as the baseline for the enhancements requires further study.

Proposal 10: RAN2 should agree on the fact that the parent IAB node or the IAB donor dynamically provides the whitelist/blacklist every time the topology is changed. The details thereof require further study.

Enhancements of Lossless Delivery

In the stage of research of Rel-15, the problem of multi-hop RLC ARQ was discussed and captured in Section 8.2.3 of TR. In Rel-16, the protocol stack was defined for the IAB including unsplit RLC layers. In other words, in Rel-16, end-to-end ARQ was excluded, and hop-by-hop ARQ was adopted.

Regarding the hop-by-hop ARQ, the problem in end-to-end reliability, that is, lossless delivery with UL packets, was identified. As illustrated in FIG. 15, three solutions were identified and evaluated.

In Rel-16, "Modification of PDCP protocol/procedures" being a first solution was not adopted because it would affect a Rel-15 UE.

"Rerouting of PDCP PDUs buffered on intermediate IAB-nodes" being a second solution was supported as an implementation selection in the BAP layer. The BAP layer may implement the second solution on the assumption that "data buffering in a transmission part of a BAP entity until an RLC-AM entity receives an acknowledgment response is implementation dependent, for example". These BAP implementations were considered in order to avoid packet loss in "most" of the cases of the Rel-16 deployment scenario, that is, when the stationary IAB node was used; however, it was not perfect as in FIG. 15, for example.

"Introducing UL status delivery" being a third solution was a promising solution for guaranteeing lossless delivery of UL data, with evaluation results cited in FIG. 15 taken into consideration. The idea was to delay the RLC ARQ to the UE, so that PDCP data recovery at the UE is initiated when necessary. However, this was not defined in Rel-16 because it had been assumed that UL packets would be rarely dropped due to topology change as the stationary IAB node was assumed.

Considering the assumption of Rel-17, that is, from the viewpoint of Proposal 1, it is no longer rare that UL packets are lost during the topology change, which occurs frequently in Rel-17, and thus the third solution should be further studied. Thus, RAN2 should discuss an enhancement mechanism for guaranteeing lossless delivery in an L2 multi-hop network, in addition to the results captured in TR.

Proposal 11: RAN2 should agree on introduction of the solution identified in TR 38.874, that is, the mechanism to guarantee lossless delivery under a condition that the topology change may frequently occur based on "UL status delivery" of some form.

The details of the third solution, that is, "Introducing UL status delivery", were discussed in two options, namely C-1 and C-2, in email discussion, as illustrated in FIG. 16.

Regarding C-1 above, it is assumed that a "confirmation" from the IAB donor needs to be defined in the BAP or the RRC for end-to-end signaling forwarding via the multi-hop L2 network. Thus, in order to define the option, a relatively high standard effort shall be required.

Regarding C-2 above, when C-2 fully functions in the IAB topology and the RLC ACK is to be transmitted to the UE (or the downstream IAB node) even if it needs to be assumed that OAM configures all of the IAB nodes with the use of the option, it finally depends on IAB-DU implementation, and thus C-2 can be actually implemented for a Rel-16 IAB node as well. Because hop-by-hop feedback is assumed and no additional Control PDUs are assumed, C-2 is easier to implement than C-1. Thus, C-2 should be the baseline for the enhancements of Rel-17 for lossless delivery of the UL packets.

Finding 6: C-2 being a solution of "Introducing UL status delivery" may be the baseline for the enhancements of Rel-17, and this can be implemented for Rel-16 as well.

Note that, because Rel-17 should assume dynamic topology change that causes UL packet loss, the enhancements of Rel-17 shall support C-2 as a standard support function. At least in the specification of stage 2, an overall mechanism based on C-2 should be described. Otherwise, in the 3GPP standard, lossless delivery is not guaranteed during the handover of the IAB node. In stage 3, although minor changes such as those of the RLC and/or the BAP are assumed, these are regarded as internal operations of the IAB node, and thus details thereof may not be defined.

Proposal 12: RAN2 should agree on definition of an RLC ARQ mechanism for implementing lossless delivery of the UL packets in stage 2. This delays transmission of the ACK to the child node/UE before the ACK is received from the parent IAB node (i.e., C-2). Whether to define this in stage 3/how to define this require further study.

The invention claimed is:

1. A communication control method comprising:

detecting, by a relay node, a failure in a radio backhaul link established between the relay node and an upper node;

determining, by the relay node, whether to initiate a recovery process of recovering the radio backhaul link;

in response to determining to initiate the recovery process, initiating, by the relay node, the recovery process;

in response to initiating the recovery process, transmitting by the relay node to a lower node of the relay node, failure information indicating the detection of the failure in the radio backhaul link; and performing, by the relay node, a cell selection procedure of determining a target cell where the radio backhaul link is to be reestablished, by using allowed cell information received from an upper node of the relay node, wherein the allowed cell information includes at least one cell identifier identifying an allowed cell being a cell that is allowed to be selected as a target cell by the relay node.

2. A relay node comprising:

a controller configured to detect a failure in a radio backhaul link established between the relay node and an upper node, and a transmitter, wherein, the controller configured to determine whether to initiate a recovery process of recovering the radio backhaul link, the controller configured to, in response to determining to initiate the recovery process, initiate the recovery process, the transmitter configured to, in response to initiating the recovery process, transmit to a lower node of the relay node, failure information indicating the detection of the failure in the radio backhaul link, and the controller configured to, perform a cell selection procedure of determining a target cell where the radio backhaul link is to be reestablished, by using allowed cell information received from an upper node of the relay node, wherein the allowed cell information includes at least one cell identifier identifying an allowed cell being a cell that is allowed to be selected as a target cell by the relay node.

3. An apparatus controlling a relay node, the apparatus comprising a processor and a memory coupled to the processor, the processor configured to:

detect a failure in a radio backhaul link established between the relay node and an upper node, determine whether to initiate a recovery process of recovering the radio backhaul link, in response to determining to initiate the recovery process, initiate the recovery process, in response to initiating the recovery process, transmit to a lower node of the relay node, failure information indicating the detection of the failure in the radio backhaul link, and perform a cell selection procedure of determining a target cell where the radio backhaul link is to be reestablished, by using allowed cell information received from an upper node of the relay node, wherein the allowed cell information includes at least one cell identifier identifying an allowed cell being a cell that is allowed to be selected as a target cell by the relay node.

* * * * *